(12) United States Patent
Nishimoto et al.

(10) Patent No.: US 7,694,404 B2
(45) Date of Patent: Apr. 13, 2010

(54) METHOD FOR ASSEMBLING MOLD FOR FORMING PLASTIC LENS

(75) Inventors: Tatsuo Nishimoto, Tokyo (JP); Akira Hamanaka, Tokyo (JP); Nobuhiko Takeda, Tokyo (JP)

(73) Assignee: Hoya Corporation, Tokyo (JP)

( * ) Notice: Subject to any disclaimer, the term of this patent is extended or adjusted under 35 U.S.C. 154(b) by 230 days.

(21) Appl. No.: 11/982,642

(22) Filed: Nov. 2, 2007

(65) Prior Publication Data

US 2008/0073803 A1   Mar. 27, 2008

Related U.S. Application Data

(62) Division of application No. 10/541,962, filed as application No. PCT/JP03/16472 on Dec. 22, 2003, now Pat. No. 7,344,370.

(30) Foreign Application Priority Data

Jan. 14, 2003  (JP)  ............... 2003-005387
Jan. 14, 2003  (JP)  ............... 2003-005390

(51) Int. Cl.
*B23Q 3/00*  (2006.01)
*B29D 11/00*  (2006.01)

(52) U.S. Cl. .................... 29/467; 264/7.5
(58) Field of Classification Search .......... 29/428, 29/467, 464; 264/2.5, 1.38, 1.36, 1.1, 2.3; 249/117, 161
See application file for complete search history.

(56) References Cited

U.S. PATENT DOCUMENTS

| 2,035,827 A | * | 3/1936 | Newell ............... 65/38 |
| 3,555,610 A | * | 1/1971 | Hirt ................. 425/472 |
| 3,938,775 A | * | 2/1976 | Sarofeen ............ 249/102 |
| 4,251,474 A | | 2/1981 | Blandin |
| 4,836,960 A | * | 6/1989 | Spector et al. ........... 264/2.2 |

(Continued)

FOREIGN PATENT DOCUMENTS

JP    55-123430 A    9/1980

(Continued)

OTHER PUBLICATIONS

"Spectacles" Jul. 1, 1987, pp. 79-81, Kabusiki Kaisha Medical Aoi Shuppan.

*Primary Examiner*—John C Hong
(74) *Attorney, Agent, or Firm*—Blakely, Sokoloff, Taylor & Zafman LLP

(57) ABSTRACT

A device (20) for assembling a plastic-lens-forming casting mold includes a gasket clamping mechanism (22) which clamps a gasket (2) from its axial direction, a first mold push-in mechanism (23) which pushes in an upper mold (3) fitted in an upper open end of the gasket (2), and a second mold push-in mechanism (24) which pushes in a lower mold (4) fitted in a lower open end of the gasket (2). The gasket clamping mechanism (22) clamps the gasket (2) from the axial direction by a gasket-pressing ring (34) and lower mold ring (35). The first mold push-in mechanism (23) pushes the upper mold (3) into the gasket (2) by a gasket push-in member (58). The second mold push-in mechanism (24) includes a plurality of push pins (68) and pushes up the lower mold (4) to push it into the gasket (2).

4 Claims, 15 Drawing Sheets

U.S. PATENT DOCUMENTS

| | | | |
|---|---|---|---|
| 4,874,561 A * | 10/1989 | Spector | 264/1.1 |
| 4,906,422 A * | 3/1990 | Buckley | 264/2.5 |
| 5,254,000 A * | 10/1993 | Friske et al. | 425/595 |
| 6,099,763 A * | 8/2000 | Su et al. | 264/2.2 |
| 6,419,860 B1 * | 7/2002 | Magne | 264/1.38 |
| 6,428,301 B1 * | 8/2002 | Fukuma et al. | 425/141 |
| 6,730,244 B1 * | 5/2004 | Lipscomb et al. | 264/1.38 |
| 6,733,701 B2 * | 5/2004 | Gross et al. | 264/2.5 |
| 2005/0200033 A1 * | 9/2005 | Kadota et al. | 264/1.31 |
| 2006/0103041 A1 * | 5/2006 | Su et al. | 264/2.5 |

FOREIGN PATENT DOCUMENTS

| | | |
|---|---|---|
| JP | 55-134224 U | 9/1980 |
| JP | 04-232706 A | 8/1992 |
| JP | 05-064816 A | 3/1993 |
| JP | 6-39951 Y | 10/1994 |
| JP | 06-98631 B | 12/1994 |
| JP | 07-137158 A | 5/1995 |
| WO | WO 98/36898 A | 8/1998 |

* cited by examiner

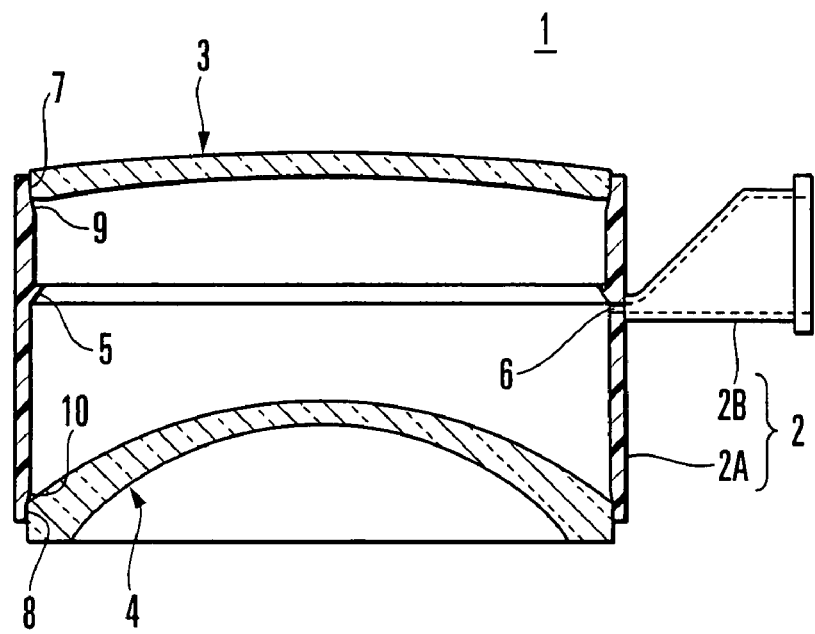
F I G . 2
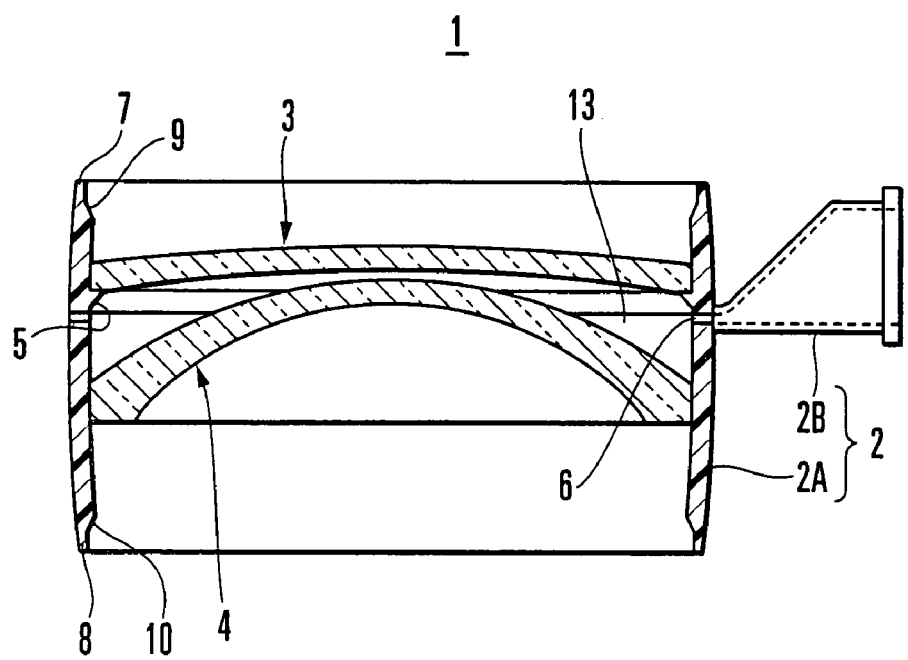
F I G . 3

METHOD FOR ASSEMBLING MOLD FOR FORMING PLASTIC LENS

The present patent application is a Divisional of application Ser. No. 10/541,962, filed Jul. 11, 2005, now U.S. Pat. No. 7,344,370 which is a non-provisional application of International Application No. PCT/JP03/16472, filed Dec. 22, 2003.

BACKGROUND OF THE INVENTION

The present invention relates to a device and method for assembling a plastic-lens-forming casting mold which is used when forming a plastic lens by casting polymerization.

Casting polymerization is known as a method of forming a plastic lens. A plastic-lens-forming casting mold used for casting polymerization usually includes a pair of molds which form the optical surfaces (convex surface and, concave surface) of a plastic lens and a cylindrical casting gasket (to be abbreviated as a gasket hereinafter) in which the molds are fitted at a predetermined gap from each other and which defines the outer diameter of the lens. When forming the lens, first, the pair of molds are incorporated in the gasket to build the casting mold. Subsequently, a liquid monomer fills the internal space (cavity) of the casting mold. The casting mold is loaded in a heating furnace, and the monomer is heated and polymerized at a predetermined temperature for a predetermined period of time to harden. The casting mold is extracted from the heating furnace and released, so that a monomer molded product (lens) in the casting mold is released from the mold and extracted (see, e.g., Japanese Patent Publication No. 6-98631, Japanese Utility Model Laid-Open No. 55-134224, Japanese Utility Model Publication No. 6-39951, U.S. Pat. No. 4,251,474, Japanese Patent Laid-Open No. 4-232706, and "Spectacles" Jul. 1, 1987, p.p. 79-81, Kabushiki Kaisha Medical Aoi Shuppan).

The plastic lens manufacturing method described in Japanese Patent Publication No. 6-98631 includes a cylindrical gasket having a ring-like projection formed on its inner surface in the circumferential direction, and upper and lower molds to be incorporated in the gasket. The upper mold forms the front surface (convex optical surface) of a lens to be formed. When the upper mold is pushed into the gasket from above, its peripheral portion abuts against the projection, so that the upper mold is positioned. The lower mold forms the rear surface (concave optical surface) of the lens, and is pushed into the gasket from below by a pushing die. The pushing die which pushes the lower mold into the gasket includes a disk-like base and a cylindrical step projecting from the base. When the lower mold is placed on the pushing die, the step is inserted in the gasket, and the base abuts against the lower end face of the gasket, to define the push-in amount of the lower mold into the gasket.

The plastic-lens-forming casting mold described in Japanese Utility Model Publication No. 6-39951 includes a gasket made of a synthetic resin into an elastic cylindrical body, and a pair of molds to be incorporated in the gasket. The gasket has a ring-like projection projecting from its inner surface. The projection positions the pair of molds.

The plastic-lens-forming casting mold described in each of Japanese Utility Model Laid-Open No. 55-134224, Japanese Utility Model Publication No. 6-39951, and U.S. Pat. No. 4,251,474 includes a gasket having a ring-like ridge projecting from its inner wall surface in the circumferential direction, and a pair of molds. The pair of molds are fitted in the gasket and positioned by the ridge.

The plastic-lens-forming casting mold described in Japanese Patent Laid-Open No. 4-232706 includes a gasket and a pair of molds to be incorporated in the gasket. The gasket has a ring-like holding band formed on its inner wall surface, and a plurality of holding portions projecting at appropriate gaps in a circumferential direction. When one mold is incorporated in the gasket, it is positioned by the ring-like holding band. When the other mold is incorporated in the gasket, it is positioned by the plurality of holding portions.

The plastic-lens-forming method described in "Spectacles", Kabushiki Kaisha Medical Aoi Shuppan, includes a small-height cylindrical gasket and a pair of molds to be incorporated in the gasket. The gasket has a ring-like projection which is formed on its inner wall surface in the circumferential direction. When the pair of molds are incorporated in the gasket, they are positioned by the projection.

When incorporating the pair of molds in the gasket, if a mold is inclined with respect to the axis of the gasket or the gap between the pair of molds is excessively large or small, lens thickness becomes nonuniform (prism defect) or insufficient to lead to a defective product. For this reason, various types of devices have been conventionally proposed to incorporate the two molds not to be inclined (for example, Japanese Patent Laid-Open Nos. 55-123430 and 2001-512383).

The method of forming a lens-forming casting mold described in Japanese Patent Laid-Open No. 55-123430 includes the step of positioning and holding two molds by a reference plate such that their lens-forming optical surfaces establish a predetermined positional relationship (reference positions for forming lens optical surfaces) and separating the two molds from the reference plate, the step of removing the reference plate, the step of setting a gasket at a position where the reference plate has been removed, and the step of returning the two molds to the reference positions for forming the lens optical surfaces and fitting them in the gasket.

According to the lens-forming casting mold described in JP Pat. Laid-Open No. 2001-512383, a rear casting mold (mold) which forms the concave surface of a lens is pushed into a gasket by a linear actuator.

SUMMARY OF THE INVENTION

The conventional methods of assembling the plastic-lens-forming casting mold described above have the following problems.

The method of forming a lens-forming casting mold described in Japanese Patent Laid-Open No. 55-123430 includes the step of positioning the lens-forming optical surfaces of the two molds at the reference positions for forming lens optical surfaces by the reference plate in advance, the step of separating the molds from the reference plate, the step of replacing the reference plate with the gasket, and the step of pushing the two molds into the gasket and returning them to the original positions (reference positions for forming the lens optical surfaces). Thus, operation of replacing the reference plate with the gasket is required, so that assembly of the casting mold takes a long period of time. A plurality of types of reference plates need be prepared in accordance with the types (sizes and dioptric powers) of the lenses, and storage and management of the lenses become cumbersome.

According to the lens-forming casting mold described in JP Pat. Laid-Open No. 2001-512383, a pneumatic gripper provided to a robot arm is detachably engaged with the front surface of a front casting mold to hold the gasket, and the rear casting mold is pushed into the gasket by the linear actuator. Thus, the reference plate described in Japanese Patent Laid-Open No. 55-123430 is not needed, and the assembling time of the casting mold can be shortened, which are advantageous. However, according to this lens-forming casting mold, the pneumatic gripper is fitted on the outer surface of the gasket to hold the gasket. Thus, a plurality of types of pneumatic grippers need to be prepared in accordance with the types (sizes and dioptric powers) of the lenses, in the same manner as in Japanese Patent Laid-Open No. 55-123430, and accordingly storage and management of the lenses become cumbersome.

According to the plastic lens manufacturing method described in Japanese Patent Publication No. 6-98631, the push-moving amount of the lower mold is determined by the height of the step of the pushing die which is to be pushed into the gasket. A plurality of types of pushing dies having steps with different heights need to be prepared in accordance with the types of the lenses, and storage and management of the lenses are cumbersome.

It is an object of the present invention to solve the conventional problems described above and provide an assembling device for a plastic-lens-forming casting mold in which a gasket and two molds can be incorporated automatically and highly accurately such that the lens thickness will not become nonuniform or insufficient.

It is another object of the present invention to provide an assembling method for a plastic-lens-forming casting mold which can assemble a gasket and two molds automatically and highly accurately and which can be applied easily to various types of casting molds.

In order to achieve the above object, there is provided an assembling device for a plastic-lens-forming casting mold, comprising a gasket clamping mechanism which clamps a casting gasket from an axial direction thereof, a first mold push-in mechanism which pushes one mold fitted in one open end of the casting gasket into the casting gasket, and a second mold push-in mechanism which pushes the other mold fitted in the other open end of the casting gasket into the casting gasket to oppose the one mold at a predetermined gap.

In order to achieve the above object, there is provided an assembling method for a plastic-lens-forming casting mold, comprising the step of fitting and temporarily fixing a pair of molds in two open ends of a casting gasket integrally having a positioning projection projecting from an inner surface of the casting gasket such that lens-forming optical surfaces of the pair of molds come inside, the step of clamping the casting gasket by a pair of clamping means from an axial direction, the first mold push-in step of pushing one of the pair of molds into the gasket by first push-in means to urge the mold against the projection, and the second mold push-in step of pushing the other mold into the gasket by second push-in means for a predetermined amount.

BRIEF DESCRIPTION OF DRAWINGS

FIG. 2 is a sectional view showing a state wherein molds are temporarily fixed to a gasket;

FIG. 3 is a sectional view showing a state wherein the molds are incorporated in the gasket to form a plastic-lens-forming casting mold;

DETAILED DESCRIPTION OF THE PREFERRED EMBODIMENTS

An assembling device and method for a plastic-lens-forming casting mold according to the present invention will be described in detail exemplifying an embodiment shown in the accompanying drawings.

Figure 1:
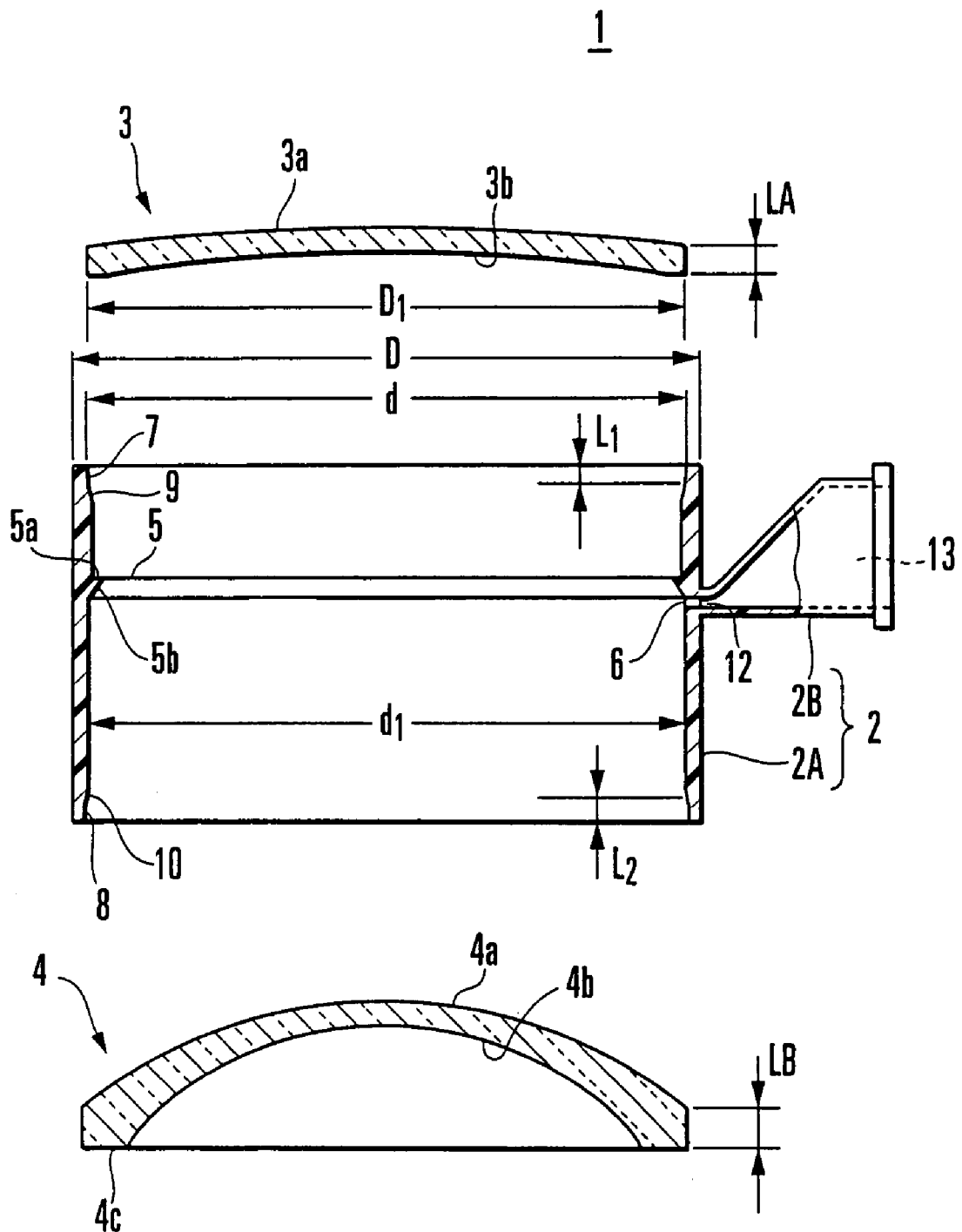
FIG. 1 is an exploded sectional view before assembly of a plastic-lens-forming casting mold which is to be assembled by an assembling device according to the present invention.

Referring to FIGS. 1 to 3, a plastic-lens-forming casting mold which is denoted by reference numeral 1 includes a gasket 2 and a pair of molds 3 and 4 to be incorporated in the gasket 2. The gasket 2 is integrally formed by injection molding of a synthetic resin to include a cylindrical body 2A and an injecting portion 2B which integrally projects from an intermediate portion in the direction of height of the outer surface of the cylindrical body 2A. The two molds 3 and 4 are incorporated in the vertical gasket 2 from above and below, respectively. Hence, in the following description, one mold 3 which is on the upper side will also be called the upper mold 3, and the other mold 4 which is on the lower side will also be called the lower mold 4.

The cylindrical body 2A has a ring-like projection 5 which integrally projects from an intermediate portion in the direction of height of the inner surface of the cylindrical body 2A. The projection 5 has a triangular section and accordingly has an upper surface 5a and inclined surface 5b which intersect with the axis of the cylindrical body 2A at appropriate angles. The upper surface 5a forms a support surface which receives and supports the peripheral portion of a concave surface 3b of the upper mold 3.

The section of the ring-like projection 5 is not limited to a triangle but can have any shape, e.g., a trapezoid or square, as far as it can receive and support the upper mold 3. The projection 5 need not have a continuous ring-like shape, but can be a plurality of discontinuous projections which are interrupted at appropriate gaps in the circumferential direction. Note that the projection 5 is not necessary when the upper mold 3 can be pushed into the gasket 2 not to be inclined, or when a semi-finished lens (a lens in which only a convex surface is optically finished) which does not require so strict an accuracy in the lens thickness is to be formed.

The cylindrical body 2A has a monomer injection port 6 formed in its outer surface. The monomer injection port 6 is formed at a portion which is immediately under the projection 5 and corresponds to the injecting portion 2B. The monomer injection port 6 forms a slit elongated in the circumferential direction of the cylindrical body 2A to allow the interiors of the cylindrical body 2A and injecting portion 2B to communicate with each other.

The cylindrical body 2A also has mold guides 7 and 8 and tapers 9 and 10 formed at the openings at the two ends of its inner surface. The mold guides 7 and 8 serve to hold the corresponding molds 3 and 4 with appropriate frictional forces and temporarily fix them not to disengage naturally. The outer diameter of each of the mold guides 7 and 8 is equal to an outer diameter D of the cylindrical body 2A. An inner diameter d of each of the mold guides 7 and 8 is substantially equal to an outer diameter $D_1$ ($D>D_1$) of each of the molds 3 and 4. Lengths $L_1$ and $L_2$ (length in the axial direction of the cylindrical body 2A) of the mold guides 7 and 8 are smaller than edge thicknesses LA and LB of the molds 3 and 4, respectively. The tapers 9 and 10 are formed inside the mold guides 7 and 8, respectively.

The state wherein the molds 3 and 4 "do not disengage naturally" refers to a state wherein the inner diameter d of each of the mold guides 7 and 8 is slightly smaller than the mold outer diameter $D_1$ ($d<D_1$) and, if the gasket material is flexible, when the molds 3 and 4 are lightly pushed, they can easily fit in the mold guides 7 and 8, respectively. Thus, in the state wherein the molds 3 and 4 fit in the mold guides 7 and 8, respectively, the lower mold 4 will not be removed from the gasket 2. Even when the gasket 2 is turned upside down, the upper mold 3 will not be removed from the gasket 2.

The tapers 9 and 10 of the gasket 2 serve as guide portions which define the fitting sizes of the molds 3 and 4 with respect to the cylindrical body 2A and allow the molds 3 and 4 to be pushed into the cylindrical body 2A when the molds 3 and 4 are temporarily fixed. For this purpose, the tapers 9 and 10 form tapered surfaces that are inclined such that their diameters decrease toward the inner side of the cylindrical body 2A. An inner diameter $d_1$ of the central portion of the inner surface (the inner surface between the tapers 8 and 9) of the cylindrical body 2A is constant and naturally set smaller than the outer diameter $D_1$ of each of the molds 3 and 4. The tapers 9 and 10 of the gasket 2 allow the upper and lower molds 3 and 4 to be pushed into the gasket 2 with ease and are effective when preventing the inner surface of the gasket 2 from being worn by the mold.

When the upper mold 3 is fitted in the mold guide 7 of the gasket 2, it abuts against the taper 9 and is temporarily fixed, so that it will not be inserted any further. When the upper mold 3 fitted in the mold guide 7 is further pushed in by a first push-in means 58 (FIG. 6) (to be described later), it passes through the taper 9 and is urged against the projection In this manner, since the upper mold 3 is finally positioned by the projection 5, the positional accuracy of the upper mold 3 which is temporarily fixed by the mold guide 7 is not very important. When the outer peripheral portion of the concave surface 3b of the upper mold 3 is urged against the projection 5 entirely, inclination of the upper mold 3 is removed with respect to the upper mold 3, so that lens thickness difference will not be caused by defective pushing. When the lower mold 4 is fitted in the mold guide 8, it abuts against the taper 10 and is temporarily fixed, so that it will not be inserted any further.

The injecting portion 2B of the gasket 2 is a portion through which the monomer is injected into the cylindrical body 2A when forming a plastic lens. The injecting portion 2B is formed such that its longitudinal sectional shape which is parallel to the surface of the sheet of FIG. 1 forms a trapezoidal funnel (see FIG. 4). An inner opening 12 of the cylindrical body 2A forms a horizontally elongated slit having a minimal longitudinal sectional area, and communicates with the injection port 6 of the cylindrical body 2A. That opening 13 of the injecting portion 2B which is opposite to the cylindrical body 2A side is rectangular and has a maximal sectional area.

As the monomer material for a general spectacle lens, a thermoplastic material such as a polyethylene-based resin, e.g., an ethylene-vinyl acetate copolymer or ethylene-propylene copolymer, having a high degree of polymerization shrinkage (about 7 to 15%) is used (for example, Japanese Patent Laid-Open Nos. 2-185586, 5-8230, 8-302336, 2000-191846, and 2000-190342). Of the materials disclosed in the above references, a particularly preferable monomer material is a very-low-density polyethylene resin which is used in this embodiment. When a monomer having a high degree of polymerization shrinkage is to be filled in the plastic-lens-forming casting mold 1 and polymerized, the mold 4 (the mold 3 too when a projection 5 for positioning the mold does not exist) is preferably moved to follow polymerization shrink of the monomer. Therefore, the gasket 2 is formed of a flexible (elastic) material to be deformable in the direction of diameter, and allows movement of the mold 4 in the axial direction.

As the gasket 2 is elastically deformable in the direction of diameter, it can fit with and hold the molds 3 and 4. More specifically, as shown in FIG. 3, when the molds 3 and 4 are pushed in deeper than the mold guides 7 and 8 of the cylindrical body 2A by a predetermined amount, they elastically deform in the direction of diameter because the inner diameter $d_1$ of that portion of the cylindrical body 2A which is deeper than the mold guide 7 or 8 is smaller than the outer diameter $D_1$ of each of the molds 3 and 4. Therefore, the cylindrical body 2A deforms into a barrel shape. The restoration force of the cylindrical body 2A fastens the outer surfaces of the molds 3 and 4 to hold them stably. When the molds 3 and 4 are completely extracted from the cylindrical body 2A, as shown in FIG. 1, or to the temporary fixing positions of the mold guides 7 and 8, as shown in FIG. 2, the cylindrical body 2A is elastically restored to the original shape so that its outer diameter D becomes constant throughout its entire length. The holding force of the cylindrical body 2A for the molds 3 and 4 is substantially constant regardless of polymerization shrink of the monomer. The relationship among the outer diameter $D_1$ of each of the molds 3 and 4 and the material and shape of the gasket 2 is designed by considering the behaviors of the gasket 2 and molds 3 and 4 during polymerization in advance.

The pair of molds 3 and 4 respectively have meniscus shapes having the same outer diameter $D_1$. The upper surface of one mold 3 forms a convex surface 3a which is curved moderately, and its lower surface forms the concave surface 3b which is also curved moderately. The convex surface 3a is not used as a lens surface and forms an arbitrary facing. The concave surface 3b forms the transfer surface (lens forming optical surface) on the convex surface side of the plastic lens to be formed. Hence, the concave surface 3b is planished with a predetermined radius of curvature. Such a mold 3 is temporarily fixed as it is fitted with one mold guide 7 of the gasket 2 such that its concave surface 3b comes inside (FIG. 2).

Figure 11:
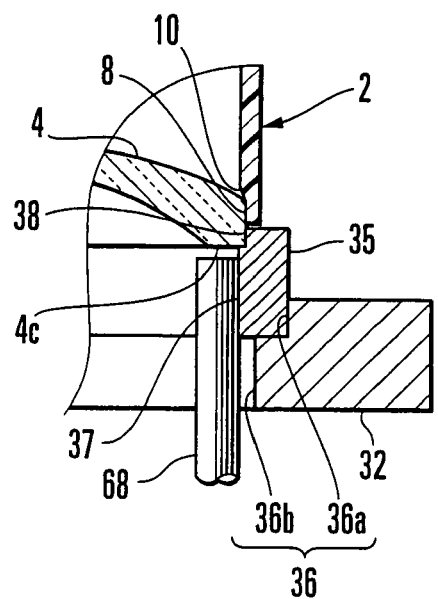
FIG. 11 is a sectional view of the main part in a state wherein the plastic-lens-forming casting mold is set on the lower mold ring.

Similarly, the upper surface of the other mold 4 has a convex surface 4a and its lower surface has a concave surface 4b. The mold 4 is temporarily fixed as it is fitted with the other mold guide 8 of the gasket 2 such that its convex surface 4a comes inside. The convex surface 4a forms a curved surface having a radius of curvature smaller than that of the concave surface 3b of one mold 3, to form a transfer surface (lens-forming optical surface) on the concave surface side of the plastic lens to be formed. Hence, the convex surface 4a is planished with a predetermined radius of curvature. The concave surface 4b is not used as a lens surface and has an arbitrary facing. The peripheral portion of the concave surface 4b forms a ring-like flat surface 4c which is perpendicular to the optical axis regardless of the meniscus shape. When pushing in the mold 4 by a second push-in means 68 (FIG. 6) (to be described later), the flat surface 4c is effective in preventing the mold 4 from being inclined. When the gasket 2 in which the molds 3 and 4 are temporarily fixed is set on a second clamping means 35 (see FIG. 6) (to be described later), the flat surface 4c is effective in setting the gasket 2 in a horizontal state. More specifically, the gasket 2 is set on the second clamping means 35 such that the peripheral portion of the lower mold 4 is fitted in a fitting groove 38 of the second clamping means 35, as shown in FIG. 11, and is then pressed from above by the first push-in means 58 (FIG. 6) (to be described later), so that the entire lower end face of the gasket 2 is urged against the upper surface of the second clamping means 35. The position of height of the gasket 2 which is urged by the second clamping means 35 corresponds to the position of origin of the gasket 2.

The outer diameters of the molds 3 and 4 differ depending on the diameter of the lens to be manufactured. After the casting mold 1 is released, if the molded lens is to be machined to shape it to have a predetermined shape, the outer diameters of the molds 3 and 4 are set to be larger than the lens diameter considering the machining margin of the machining.

Such a pair of molds 3 and 4 are fitted and temporarily fixed in the mold guides 7 and 8, respectively, of the cylindrical body 2A, as shown in FIG. 2, and are pushed into the gasket 2 by an incorporating device 20 (to be described later) and positioned at predetermined positions, thus completing assembly of the plastic-lens-forming casting mold 1. In this case, the upper mold 3 is positioned as the peripheral portion of its concave surface 3b abuts against the support surface 5a of the projection 5. Thus, the push-moving amount into the gasket 2 is constant regardless of the type of the lens to be formed.

The lower mold 4 is pushed in by a distance (push-moving amount) H (FIG. 7) matching the type (dioptric power) of the lens to be formed, to oppose the upper mold 3 at a predetermined gap. Thus, the space surrounded by the gasket 2 and two molds 3 and 4 forms the plastic-lens-forming cavity 13 (FIG. 13) which communicates with the interior of the injecting portion 2B through the injection port 6. The monomer is injected into the cavity 13. In this case, naturally, the pair of molds 3 and 4 may be inverted upside down and incorporated in the gasket 2 to assemble the plastic-lens-forming casting mold 1.

The structure, incorporating method, and the like of the incorporating device 20 which is to incorporate the plastic-lens-forming casting mold 1 will be described in detail.

Figure 4:
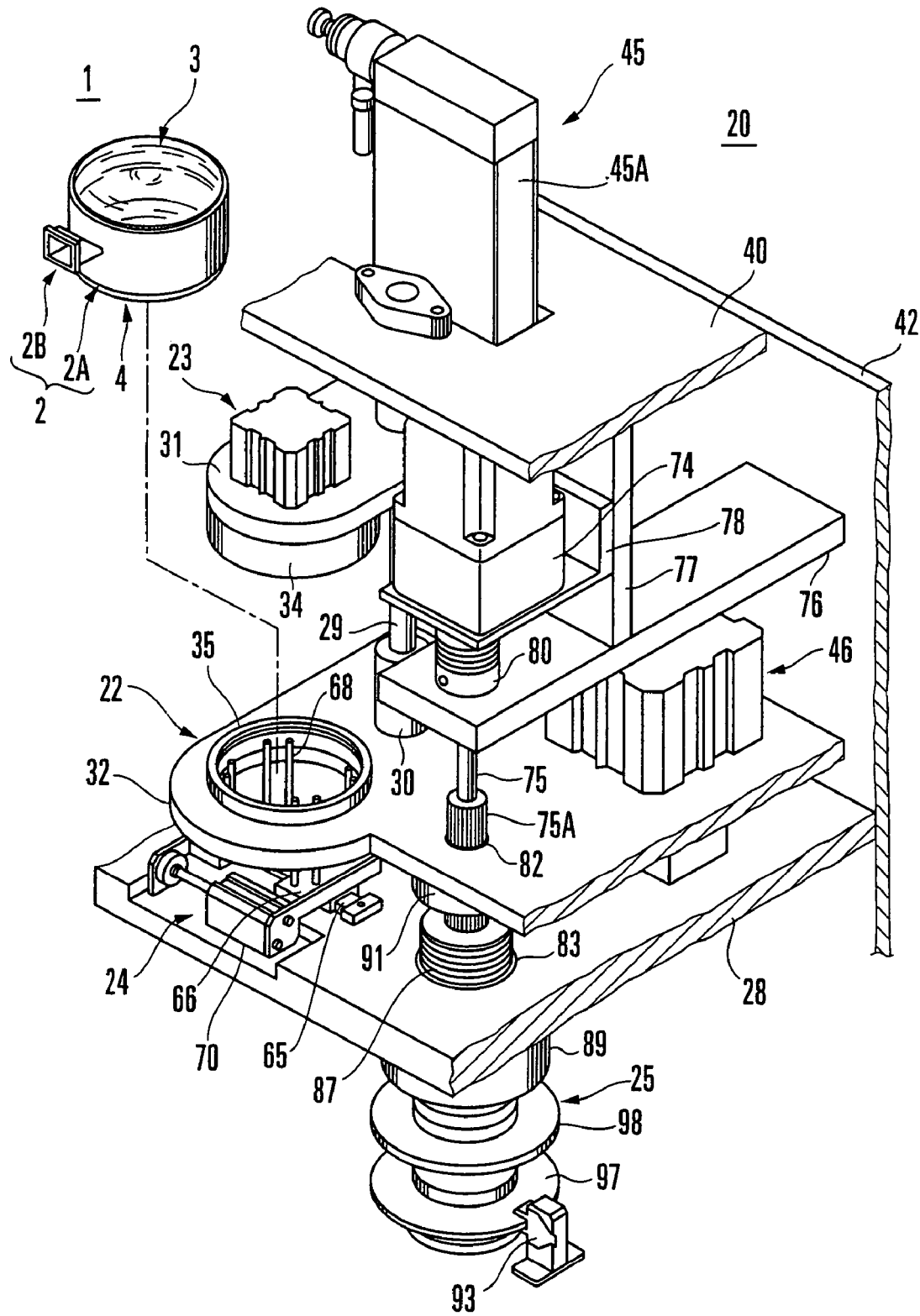
FIG. 4 is a perspective view of the main part of the assembling device.
Figure 5:
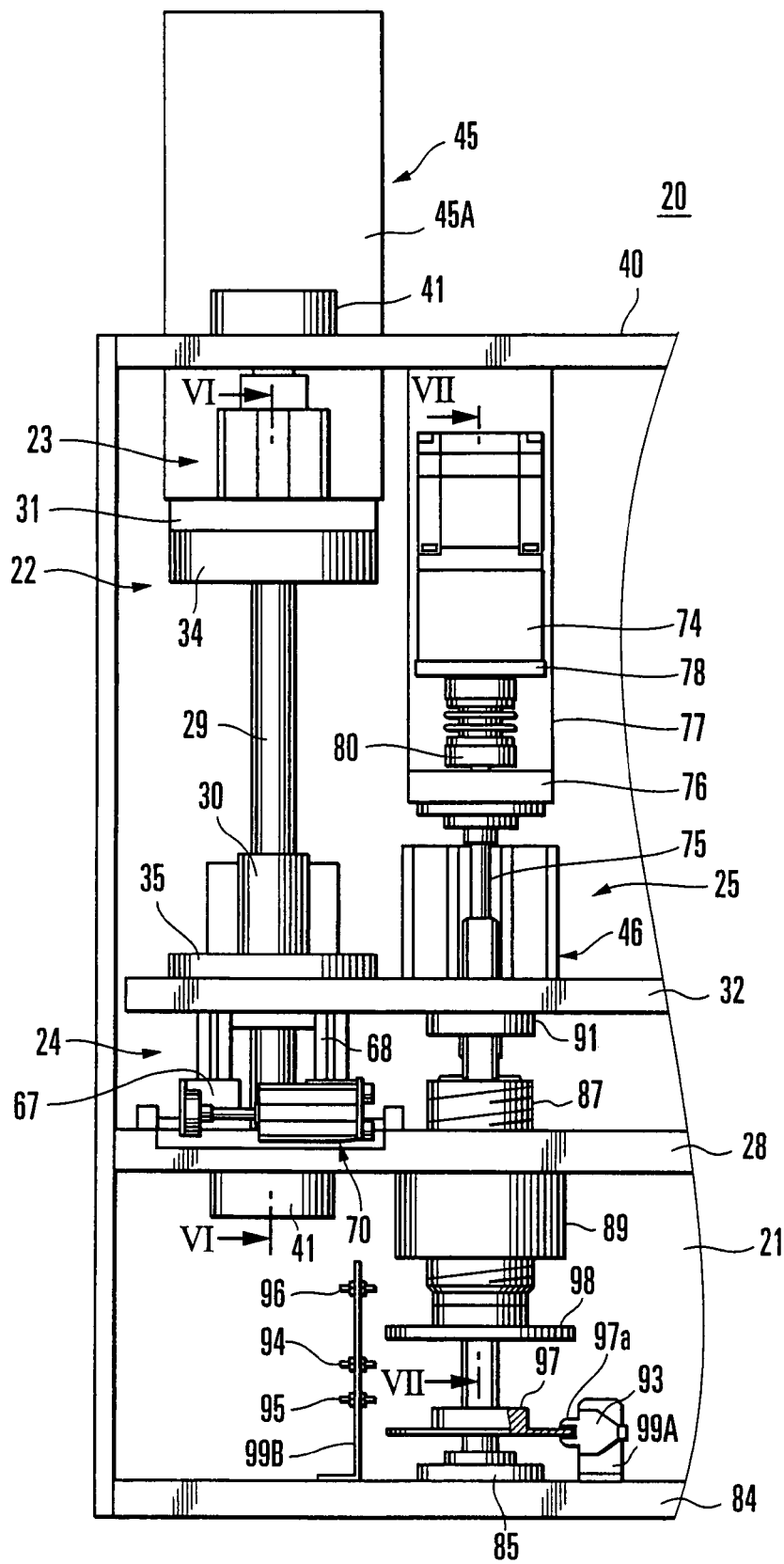
FIG. 5 is a front view of the main part of the assembling device.
Figure 6:
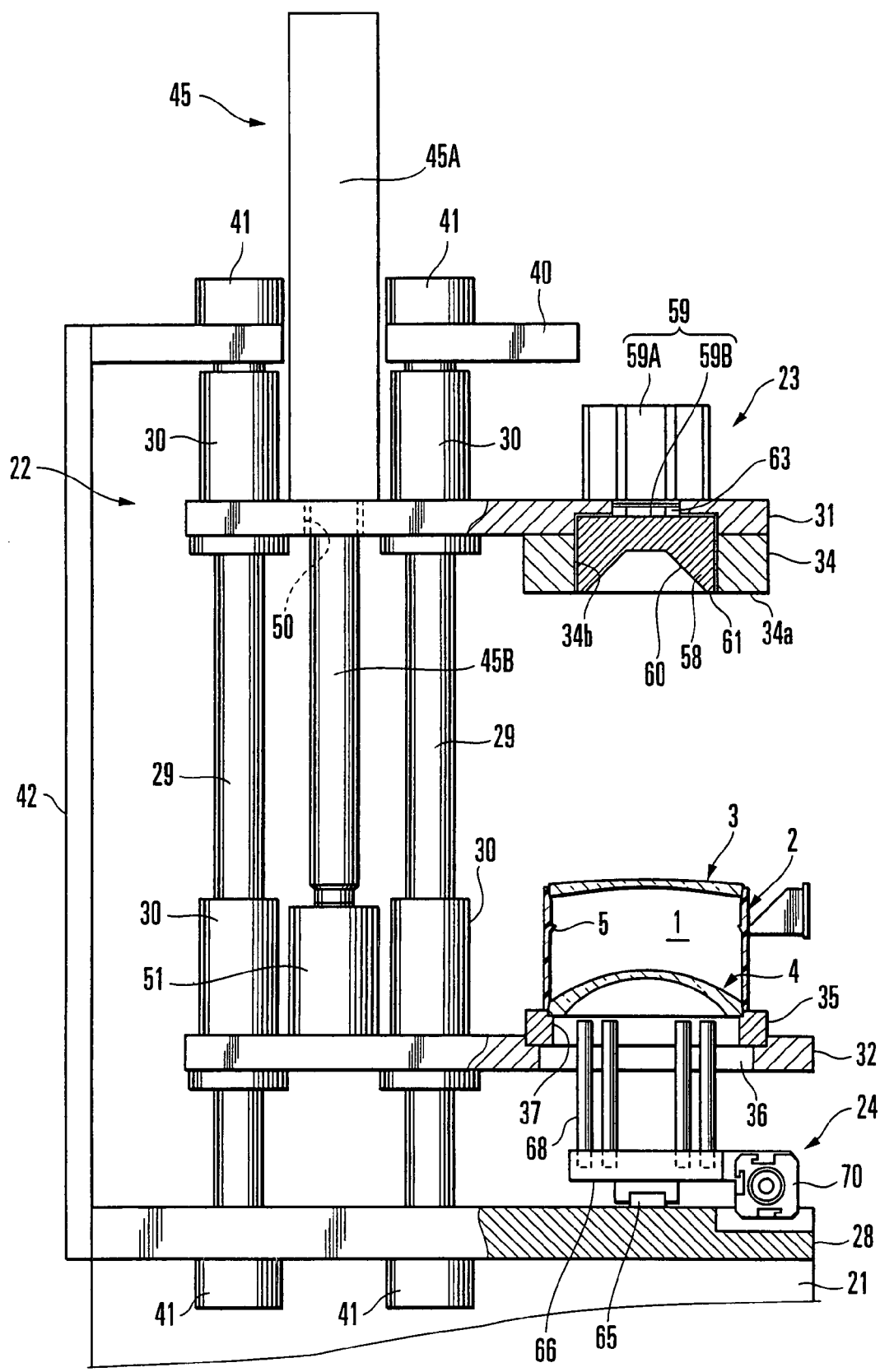
FIG. 6 is a sectional view taken along the line VI-VI of FIG. 5.

Referring to FIGS. 4 to 6, the incorporating device 20 for the plastic-lens-forming casting mold 1 includes a housing 21, a gasket clamping mechanism 22 disposed in the housing 21, a first mold push-in mechanism 23 which pushes the upper mold 3 into the gasket 2, a second mold push-in mechanism 24 which pushes the lower mold 4 into the gasket 2, a mold push-moving amount adjusting mechanism 25 which adjusts the push-moving amount H of the lower mold 4 in accordance with the type of the lens to be fabricated, and the like.

The gasket clamping mechanism 22 includes an upper plate 31 and lower plate 32 which are disposed on a plurality of guide posts 29 vertically standing upright on a base plate 28 of the housing 21 through linear bushes 30 to be vertically movable. The upper plate 31 includes the first mold push-in mechanism 23 and a first clamping means (gasket-pressing ring) 34. The lower plate 32 includes the detachable second clamping means (lower mold ring) 35 on which the plastic-lens-forming casting mold 1 is to be set.

The guide posts 29 extend through holes formed in a top plate 40 and the base plate 28, and their upper and lower ends are fixed to the plates 40 and 28 through shaft holders 41. The rear ends of the base plate 28 and top plate 40 are connected to each other through a rear plate 42.

The lower plate 32 has a ring attaching hole 36 in its front end. As shown in FIG. 11, the ring attaching hole 36 has different-diameter through holes formed of an upper large-diameter hole portion 36a and lower small-diameter hole portion 36b. The lower mold ring 35 is detachably fitted in the large-diameter hole portion 36a.

A lower surface 34a of the gasket-pressing ring 34 forms a press surface which presses the end face of the upper opening of the gasket 2. The gasket-pressing ring 34 is fixed to the lower surface of the front end of the upper plate 31. A center hole 34b of the gasket-pressing ring 34 has a hole diameter sufficiently smaller than the inner diameter d of the gasket 2. The first incorporating means 58 of the first mold push-in mechanism 23 is incorporated in the center hole 34b.

Referring to FIG. 11, the lower mold ring 35 has a through hole 37 having a hole diameter slightly smaller than the inner diameter $d_1$ of the gasket 2, and a fitting groove 38. The fitting groove 38 is formed of an annular groove which is formed in the opening of the upper end of the through hole 37 throughout the entire circumference. The downward projecting lower end of the gasket 2 is fitted with the peripheral portion of the mold 4. As the lower mold ring 35 of this type, a plurality of types having fitting grooves 38 with different inner diameters are prepared to match the diameters of the lenses to be formed. The plurality of types of lower mold rings 35 have the same outer diameter because any ring 35 must be able to be fitted in the large-diameter hole portion 36a of the ring attaching hole 36 of the lower plate 32. In general, regarding the lower mold ring 35, since the standard diameter of the lens includes five types, i.e., 60 mm, 65 mm, 70 mm, 75 mm, and 80 mm, five types of rings 35 are prepared to correspond to the respective lenses.

Referring to FIG. 6, the gasket clamping mechanism 22 further includes a gasket-pressing pneumatic cylinder (clamping driving unit) 45 which vertically moves the upper plate 31 along the guide posts 29, and a main pneumatic cylinder (gasket moving driving unit) 46 which vertically moves the upper plate 31 and lower plate 32 integrally along the guide posts 29.

The gasket-pressing pneumatic cylinder 45 includes a cylinder main body 45A which is set on the upper surface of the upper plate 31 to face down, and a piston rod 45B which projects downward from the cylinder main body 45A. The piston rod 45B extends through an insertion hole 50 of the upper plate 31 to be vertically movable in noncontact with the insertion hole 50. The lower end of the piston rod 45B is connected to a joint 51 arranged on the upper surface of the lower plate 32. The piston rod 45B is usually held to be projecting (moving forward) from the cylinder main body 45A by a maximal stroke, to hold the upper plate 31 at the highest initial position shown in FIG. 6. At this time, the gasket-pressing ring 34 and lower mold ring 35 are separate from each other by the maximal stroke. In this state, when air supply to the cylinder main body 45A is switched to such a direction that the piston rod 45B moves backward (upward), the piston rod 45B itself cannot move upward as its lower end is fixed to the joint 51, and instead the cylinder main body 45A moves downward along the piston rod 45B together with the upper plate 31. Hence, the gasket-pressing pneumatic cylinder 45 moves downward together with the upper plate 31 to push down the mold 3 to press it into the gasket 2. The pulling output of the gasket-pressing pneumatic cylinder 45, i.e., the force (press force) with which the gasket-pressing ring 34 presses the gasket 2 upon downward movement of the upper plate 31 and cylinder main body 45A, is set to, e.g., 495 N (Newton). Note that this press force is freely adjustable by a regulator (not shown).

Figure 7:
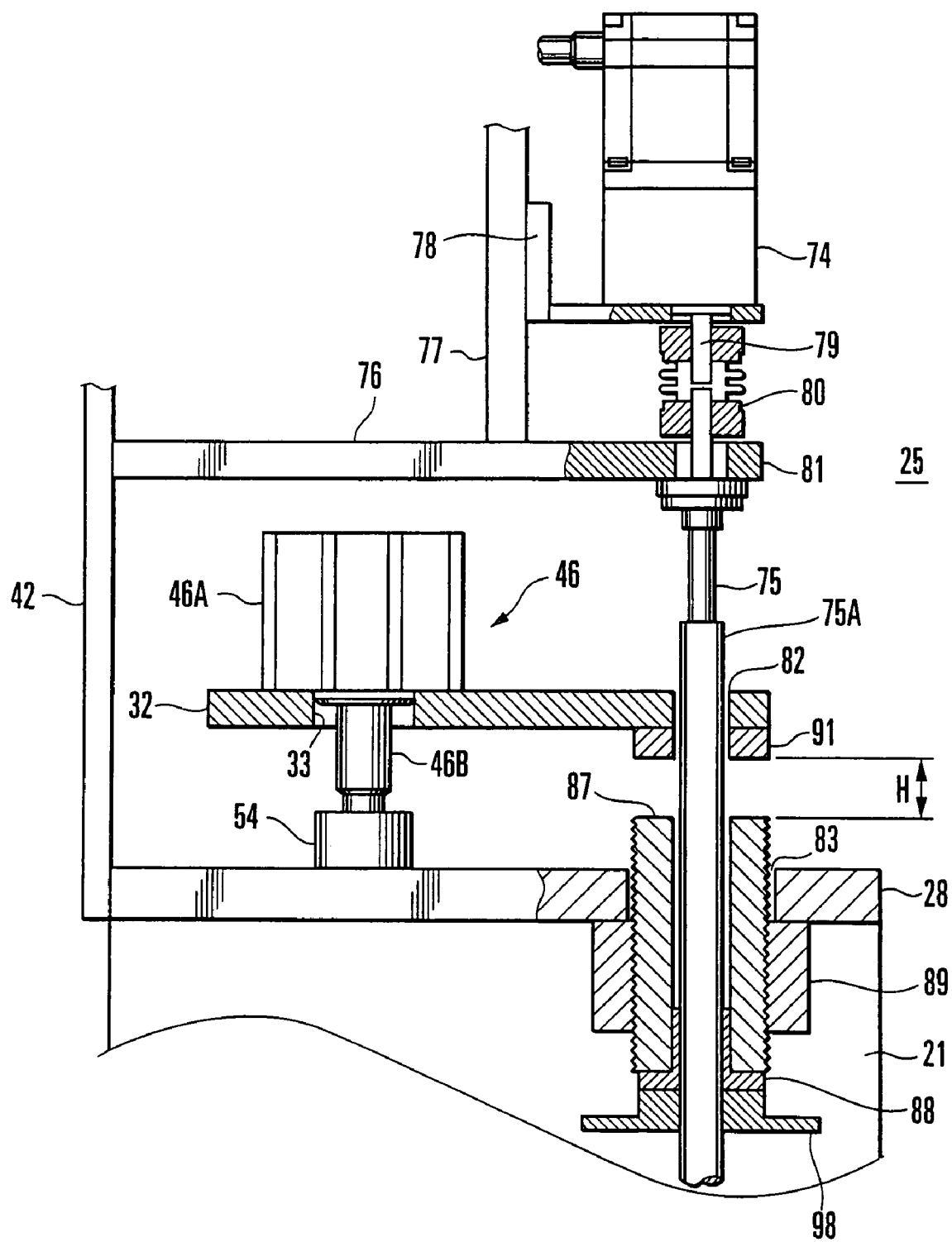
FIG. 7 is a sectional view taken along the line VII-VII of FIG. 5.

Referring to FIG. 7, the main pneumatic cylinder 46 includes a cylinder main body 46A which is set on the upper surface of the lower plate 32 to face down, and a piston rod 46B which projects downward from the cylinder main body 46A. The piston rod 46B extends through an insertion hole 33 formed in the lower plate 32 to be vertically movable in noncontact with the insertion hole 33. The lower end of the piston rod 46B is connected to the base plate 28 through a joint 54. The piston rod 46B is usually held to be projecting (moving forward) from the cylinder main body 46A by a maximal stroke, to hold the lower plate 32 at the highest initial position with respect to an adjusting screw 87 of the mold push-moving amount adjusting mechanism 25. In this state, when air supply to the cylinder main body 46A is switched to such a direction that the piston rod 46B moves backward (upward), the piston rod 46B itself cannot move upward as it is fixed to the joint 54, and instead the cylinder main body 46A moves downward together with the lower plate 32 to urge the lower mold 4 against the second mold push-in mechanism 24 (FIG. 6). The pulling output of the main pneumatic cylinder 46 at this time, i.e., the force (press force) with which the cylinder main body 46A moves downward together with the lower plate 32 to urge the lower mold 4 against the second mold push-in mechanism 24, is set to a value sufficiently larger than the press force of the gasket-pressing pneumatic cylinder 45, e.g., 1,400 N (Newton). Note that this press force is freely adjustable by a regulator (not shown).

Referring to FIG. 6, the first mold push-in mechanism 23 includes the first push-in means 58 (to be referred to as a push-in member) which is retractably fitted and inserted in the center hole 34b of the gasket-pressing ring 34, and an upper-mold-pressing pneumatic cylinder 59 which vertically moves the push-in member 58. The push-in member 58 forms a disk having a circular frustoconical concave 60 at the center of its lower surface. That flat surface of the push-in member 58 which is outside the concave 60 forms a press surface 61 which presses the upper surface 3a of the upper mold 3. The push-in member 58 is usually located in the gasket-pressing ring 34, and the press surface 61 is almost flush with the lower surface 34a of the gasket-pressing ring 34. The lower surface 34a of the gasket-pressing ring 34 forms a gasket press surface which presses the upper end face of the gasket 2.

The upper-mold-pressing pneumatic cylinder 59 includes a cylinder main body 59A which is set on the upper surface of the upper plate 31 to face down, and a piston rod 59B which projects downward from the cylinder main body 59A. The piston rod 59B extends through an insertion hole 63 formed in the upper plate 31 to be vertically movable in noncontact with the insertion hole 63. The push-in member 58 is fixed to the lower end of the piston rod 59B. The pushing force of the upper-mold-pressing pneumatic cylinder 59, i.e., the force (press force) of the push-in member 58 to push the upper mold 3 into the gasket 2, is set to a value smaller than the press force of the gasket-pressing pneumatic cylinder 45, e.g., 254 N (Newton). Note that this press force is freely adjustable by a regulator (not shown).

Figure 8:
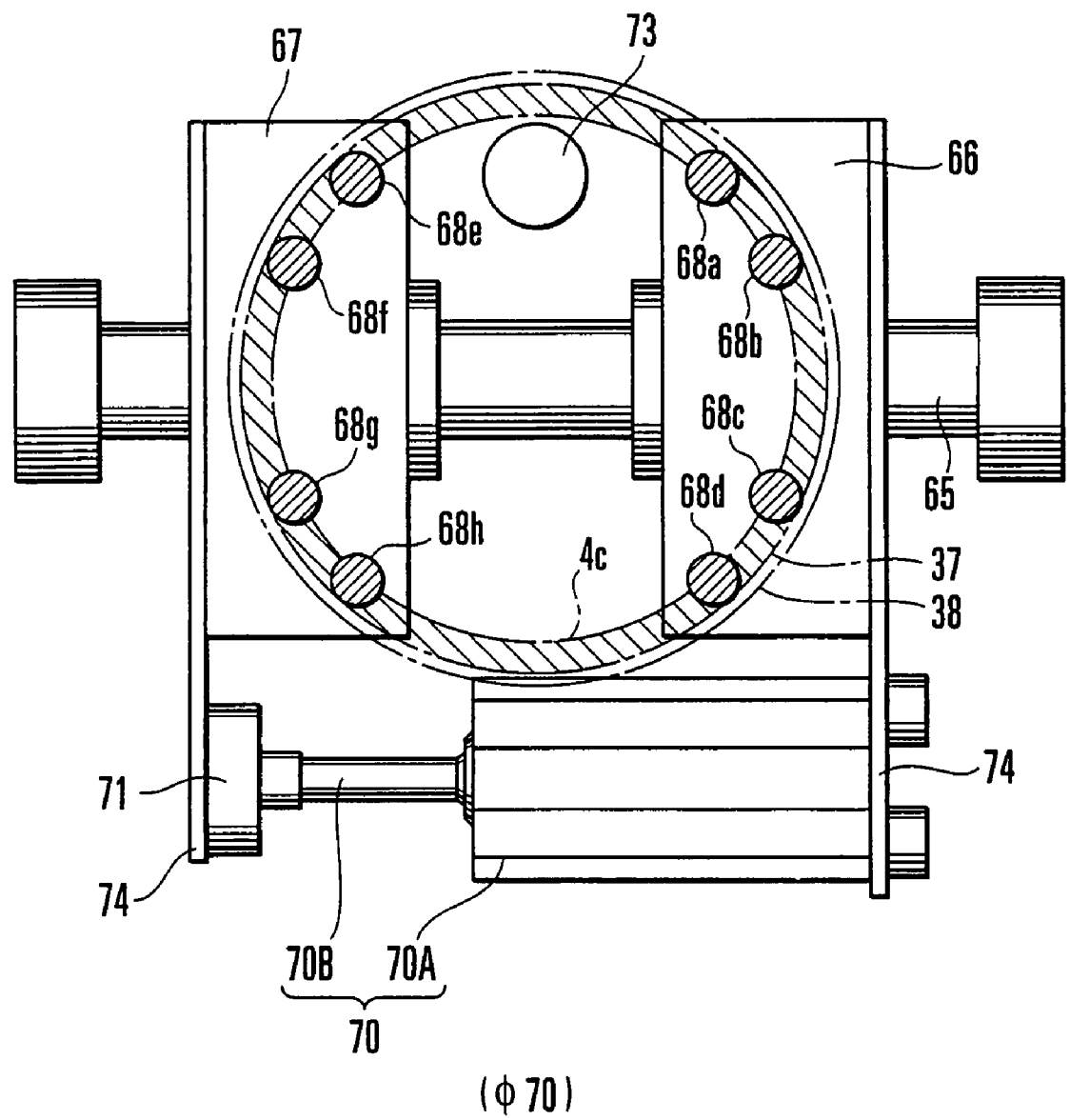
FIG. 8 is a plan view of a second mold push-in mechanism and shows the relationship between push pins and a lower mold ring for a lens having a standard diameter of 70 mm.

Referring to FIGS. 6 and 8, the second mold push-in mechanism 24 includes an LM guide 65 which is set on the base plate 28, two slide plates 66 and 67 which are arranged movable to come close to and separate from each other along the LM guide 65, and the second push-in means 68. The slide plates 66 and 67 are biased by a pin opening/closing pneumatic cylinder 70 in directions to separate from each other. The pin opening/closing pneumatic cylinder 70 is set on the base plate 28. The second push-in means 68 includes a total of eight push pins 68a to 68h, i.e., four push pins which project from the slide plate 66 and four push pins which project from the slide plate 67 substantially concentrically. As the slide plates 66 and 67 are biased in the separating directions, the push pins 68a to 68h are urged against the hole wall of the through hole 37 of the lower mold ring 35.

Figure 9:
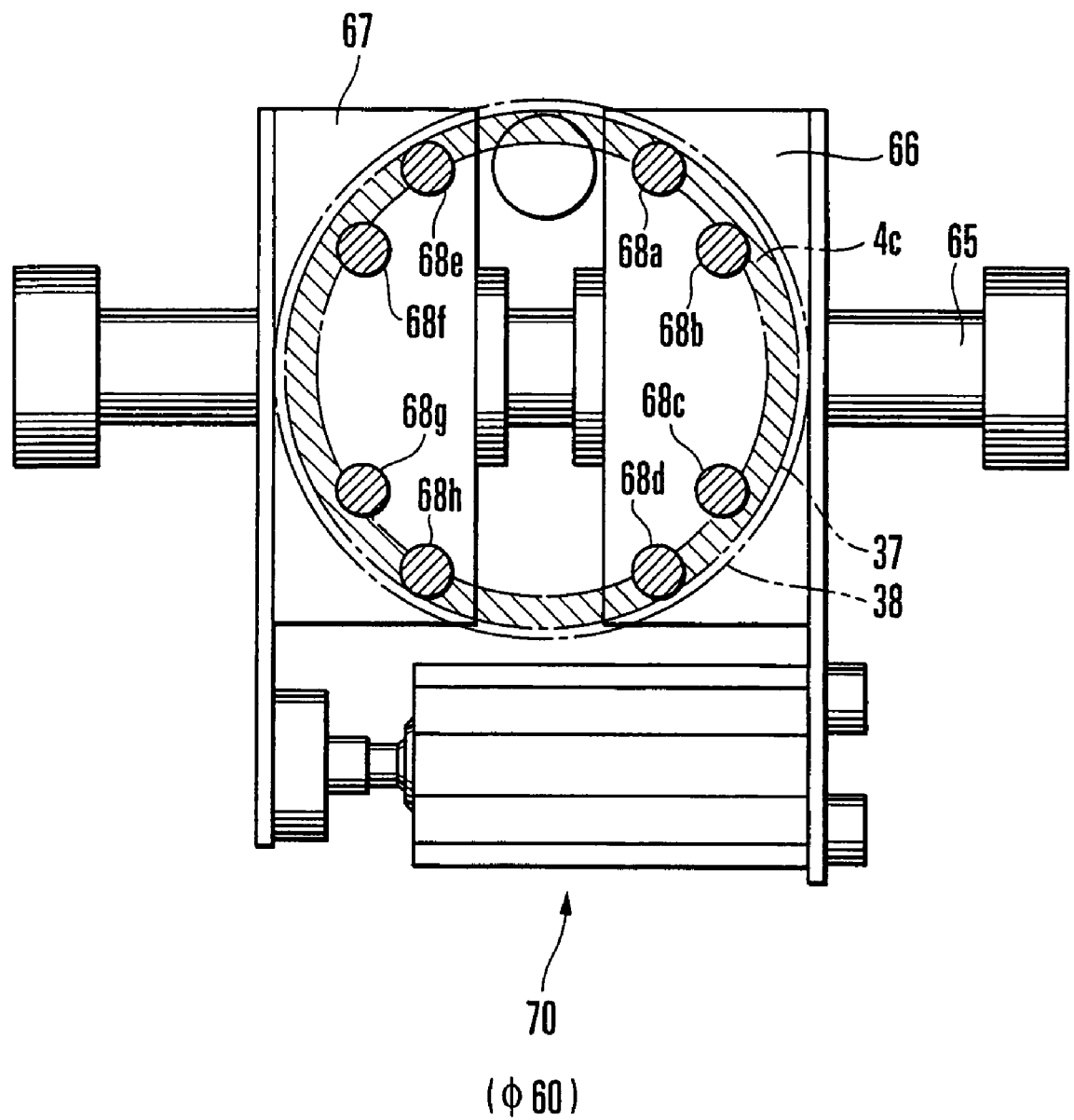
FIG. 9 is a view showing the relationship between the push pins and a lower mold ring for a lens having a standard diameter of 60 mm.
Figure 10:
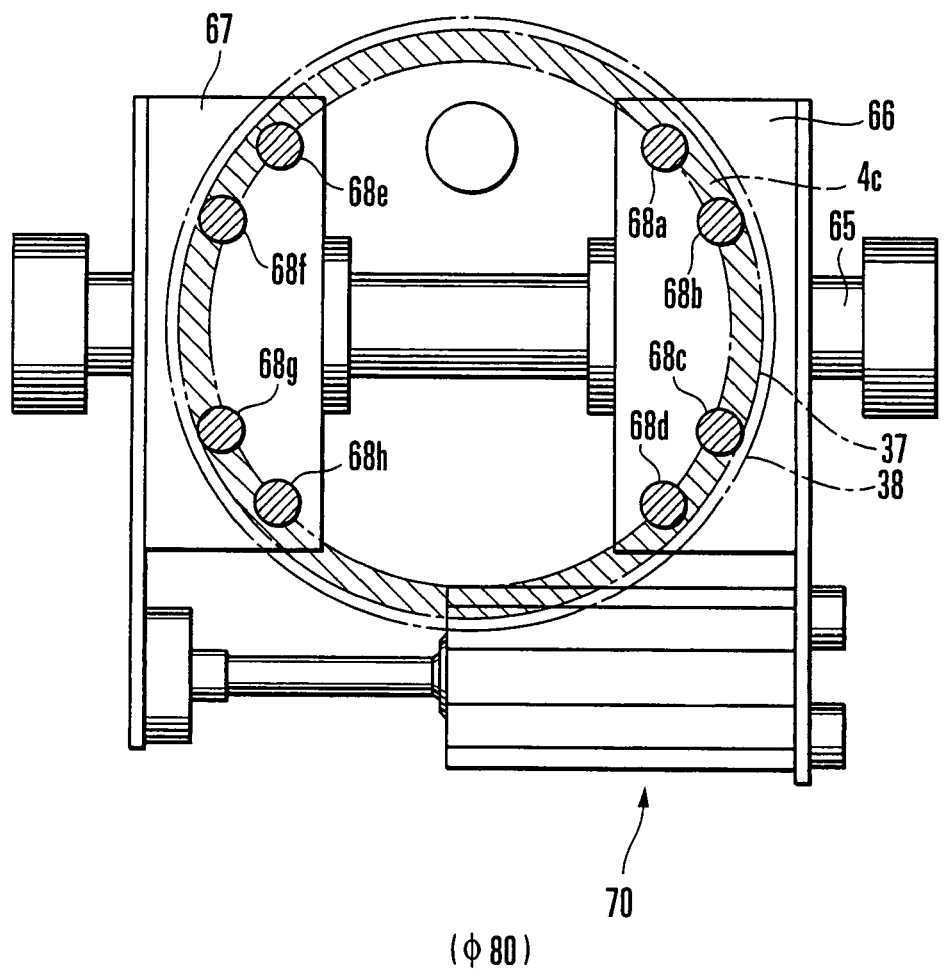
FIG. 10 is a view showing the relationship between the push pins and a lower mold ring for a lens having a standard diameter of 80 mm.

How the push pins 68 come into contact with the inner wall of the lower mold ring 35 differs depending on the diameter of the lens to be fabricated. More specifically, when the lower mold ring 35 is for a lens having a standard diameter of 70 mm, all the push pins 68a to 68h are arrayed concentrically such that their outer surfaces come into contact with the hole wall of the through hole 37, as shown in FIG. 8. When the lower mold ring 35 is for a lens having a standard diameter of 60 mm, as shown in FIG. 9, the two slide plates 67 and 68 are closer to each other than in a case of the lower mold ring 35 for a lens having a standard diameter of 70 mm. Only the outer four push pins 68a, 68d, 68e, and 68h standing at positions far from the LM guide 65 come into contact with the hole wall of the through hole 37, while the inner four push pins 68b, 68c, 68f, and 68g are separate from the hole wall. When the lower mold ring 35 is for a lens having a standard diameter of 80 mm, as shown in FIG. 10, the two slide plates 66 and 67 are separate from each other. Only the inner four push pins 68b, 68c, 68f, and 68g standing at positions close to the LM guide 65 come into contact with the hole wall of the through hole 37, while the outer four push pins 68a, 68d, 68e, and 68h are separate from the hole wall.

In this manner, depending on the lens diameter, even if only some push pins 68 are in contact with the hole wall of the through hole 37 of the lower mold ring 35 while the remaining push pins 68 are separate from the hole wall, the separate pins are not located completely inside the flat surface 4c of the lower mold 4, but the upper surfaces of the separate pins partially overlap the flat surface 4c. Therefore, all the push pins 68 can come into contact with the flat surface 4c of the lower mold 4 without failure regardless of the lens diameter, thus contributing to pushing in the lower mold 4.

Referring to FIG. 8, the pin opening/closing pneumatic cylinder 70 includes a cylinder main body 70A which is fixed on one slide plate 66 sideways, and a piston rod 70B which projects from the cylinder main body 70A and is connected to the other slide plate 67 through a joint 71. Although the press force of the pin opening/closing pneumatic cylinder 70 is set to 11 N, it is not limited to this value, but can be freely adjusted by a regulator (not shown). When the plastic-lens-forming casting mold 1 in which the molds 3 and 4 are fitted and temporarily assembled in the respective open ends of the gasket 2 is set on the lower mold ring 35, as shown in FIG. 6, the eight push pins 68 are inserted in the lower mold ring 35, and the upper surfaces of the push pins 68 are located below the flat surface 4c of the mold 4 in noncontact with the flat surface 4c, as shown in FIG. 8. The layout of the plastic-lens-forming casting mold 1 is not limited to this, but the lower mold 4 may be set on the upper surfaces of the push pins 68.

Although the pneumatic cylinder 70 is used as a means for biasing the push pins 68 in the opening directions, the present invention is not limited to this, but a compression coil spring, tension coil spring, or the like may be used. Referring to FIG. 8, reference numeral 73 denotes a stopper which limits the movement of the slide plates 66 and 67 to come close to each other; and 74, stays.

This embodiment exemplifies a case wherein all of the eight push-pins 68a to 68h are brought into contact with the hole wall of the lower mold ring 35 for a lens having a standard diameter of 70 mm. If a lower mold ring 35 for a lens having a standard diameter other than 70 mm is employed, only four push pins are brought into contact with the hole wall of the lower mold ring 35. However, the present invention is not limited to this. For example, four to eight push pins 68 which are independent of each other may be used. When these push pins 68 are arranged to be movable in radial directions from the center of the lower mold ring 35 and biased in opening directions (radial directions), all the push pins 68 can be brought into contact with the hole walls of any one of all lower mold rings 35 having different inner diameters.

Referring to FIGS. 4, 5, and 7, the mold push-moving amount adjusting mechanism 25 is used to set the push-moving amount (H) of the lower mold 4 against the gasket 2 in advance in accordance with the type of the lens, and includes a stepping motor 74 and a spline shaft 75 which is rotated by the stepping motor 74. The stepping motor 74 is set on a vertical attaching plate 77 through a bracket 78 to face down. The upper end of the spline shaft 75 is connected to an output shaft 79 of the stepping motor 74 through a coupling 80. The attaching plate 77 stands upright on a horizontal support plate 76 located above the lower plate 32.

The spline shaft 75 extends through holes 81, 82, and 83 respectively formed in the support plate 76, lower plate 32, and base plate 28 in noncontact with the through holes 81, 82, and 83. The lower end of the spline shaft 75 is rotatably, axially supported by a bearing 85 fixed on a bottom plate 84 (FIG. 5) of the housing 21. The adjusting screw 87 is fitted on the spline shaft 75 through a spline bearing 88. The adjusting screw 87 threadably engages with a stationary nut 89 fixed to the lower surface of the base plate 28, and its upper end projects above the base plate 28. The spline bearing 88 is fitted and fixed in the lower open end of the adjusting screw 87, and slidably fits with a spline 75A of the spline shaft 75 through spline coupling.

A stopper 91 is fixed to the lower surface of the distal end of the lower plate 32 to correspond to the adjusting screw 87. The distance between the adjusting screw 87 and stopper 91 is a distance that matches the type of the lens to be fabricated, i.e., the push-moving amount H of the lower mold 4. The stopper 91 forms a ring, and the spline shaft 75 extends through the center hole of the stopper 91 to be vertically movable.

The adjusting screw 87 is usually held at the lowest position (position of origin), and is driven by the stepping motor 74 to move upward to a desired height position when setting the push-moving amount H of the lower mold 4. More specifically, when the stepping motor 74 is driven, the rotation of the output shaft 79 is transmitted to the spline shaft 75 through the coupling 80, and the rotation of the spline shaft 75 is transmitted to the adjusting screw 87 through the spline bearing 88. Accordingly, the adjusting screw 87 moves upward to a desired height, while rotating with respect to the stationary nut 89, and stops to set the predetermined push-moving amount H with respect to the stopper 91. In this mold push-moving amount adjusting mechanism 25, even if the press force of the main cylinder 46 is applied as a load to the adjusting screw 87 through the stopper 91, no load is applied to the rotating portion of the stepping motor 74 due to the spline connection of the spline shaft 75 and spline bearing 88. Accordingly, the rotation of the stepping motor 74 is smoothly transmitted to the adjusting screw 87 through the spline connection of the spline shaft 75 and spline bearing 88.

The push-moving amount (distance H) of the lower mold 4 is (X-Xi) where X is the maximal distance from the adjusting screw 87 to the lower surface of the stopper 91 when the adjusting screw 87 is moved to the lowest position by operating the origin, and Xi is the moving distance (variable value) of the upward movement of the adjusting screw 87 from the position of origin which is set for every dioptric power of the lens. The variable value Xi is determined considering the shapes of the molds 3 and 4 according to the prescription of the lens, the preset lens thickness, the adjusting amounts of the movements of the molds 3 and 4 required due to the polymerization shrink of the monomer and thermal deformation of the gasket 2 during the thermal polymerization process, the deformation amount of the gasket 2 due to assembly of the molds 3 and 4, the relationship between the lower mold ring 35 and push pins 68, and the like.

The rate of polymerization shrink of the monomer differs depending on the lens material. Similarly, the thermal deformation amount of the gasket 2 differs depending on the gasket material. Shape factors including the thickness of the gasket 2 and shape factors of the molds 3 and 4 also adversely affect thermal deformation. Accordingly, as the push-moving amount H, a verified value which is obtained from experimental composite data of all of these factors is used.

Referring to FIG. 5, reference numeral 93 denotes a first origin sensor. The origin sensor 93 comprises a photosensor and is attached to a first stay 99A which stands upright on the bottom plate 84. The first origin sensor 93 detects a slit 97a of a sensor slit cam 97 attached to the spline shaft 75 to optically detect the rotational angle, necessary for stopping, of the spline shaft 75.

Reference numeral 94 denotes a second origin sensor; 95, a lower limit sensor; and 96, an upper limit sensor. The sensors 94, 95, and 96 are similarly attached to a second stay 99B which also stands upright on the bottom plate 84. The second origin sensor 94 comprises a reflecting photoelectric sensor, and optically detects a sensor disk 98 attached to the adjusting screw 87 to detect the height of the initial position of the adjusting screw 87. The lower limit sensor 95 and upper limit sensor 96 are sensors which detect the sensor disk 98 when the adjusting screw 87 overruns down or up. A detection signal from the second origin sensor 94 stops driving of the stepping motor 74. As the lower limit sensor 95 and upper limit sensor 96, reflecting photoelectric sensors are similarly used. However, the lower limit sensor 95 and upper limit sensor 96 are not limited to reflecting photoelectric sensors, but may be limit switches.

Figure 12:
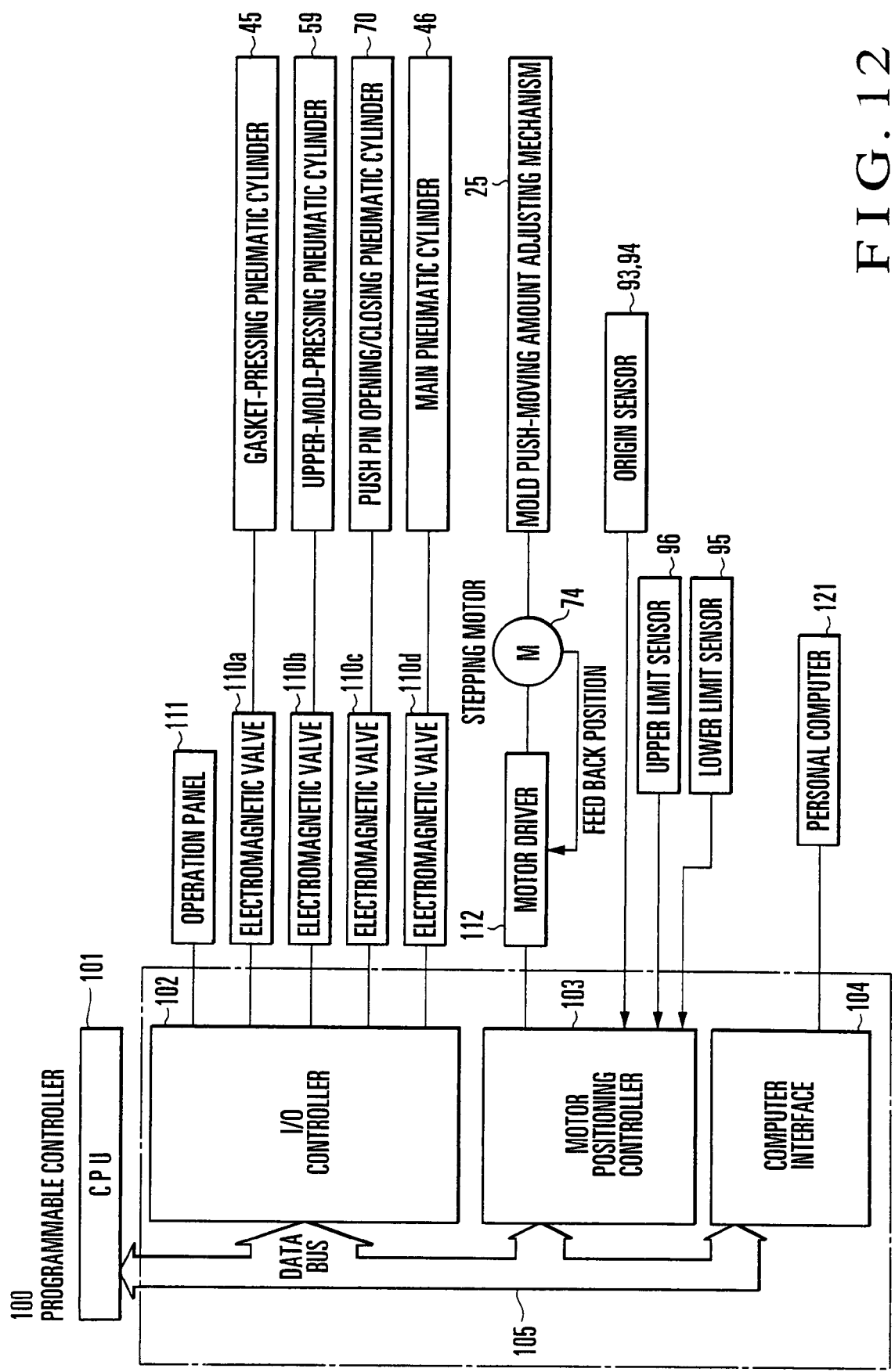
FIG. 12 is a control block diagram of the assembling device.

Referring to FIG. 12, a program controller 100 which controls the entire assembling device 20 includes an I/O controller 102, motor positioning controller 103, and computer interface 104. The I/O controller 102, motor positioning controller 103, and computer interface 104 are connected through a data bus 105 and managed by a CPU 101. The I/O controller 102 is connected to the gasket-pressing pneumatic cylinder 45, upper-mold-pressing pneumatic cylinder 59, pin opening/closing pneumatic cylinder 70, and main pneumatic cylinder 46 through electromagnetic valves 110a to 110d, respectively, to receive signals from input/output units of an operation panel 111. The motor positioning controller 103 is connected to the stepping motor 74 through a motor driver 112, as well as to the first and second origin sensors 93 and 94, lower limit sensor 95, and upper limit sensor 96. The computer interface 104 is connected to an external personal computer 121.

Upon reception of a signal sent from the input unit (an operation switch or setting unit) of the operation panel 111 through the I/O controller 102, the CPU 101 performs the process for the entire device in accordance with preset programming. More specifically, in response to a command, the CPU 101 sequentially drives the electromagnetic valves 110*a* to 110*d* through the I/O controller 102 to operate the gasket-pressing pneumatic cylinder 45, upper-mold-pressing pneumatic cylinder 59, pin opening/closing pneumatic cylinder 70, and main pneumatic cylinder 46, respectively. The CPU 101 also sends a positioning command to the motor positioning controller 103. In response to the positioning command, the motor positioning controller 103 sends a driving signal to the stepping motor 74 of the mold push-moving amount adjusting mechanism 25 through the motor driver 112. The stepping motor 74 is driven by the driving signal from the motor positioning controller 103 to rotate the spline shaft 75 (FIGS. 5 and 7). As a result, the adjusting screw 87 moves upward to a desired height position and stops there to set a predetermined push-moving amount H with respect to the stopper 91.

Figure 13:
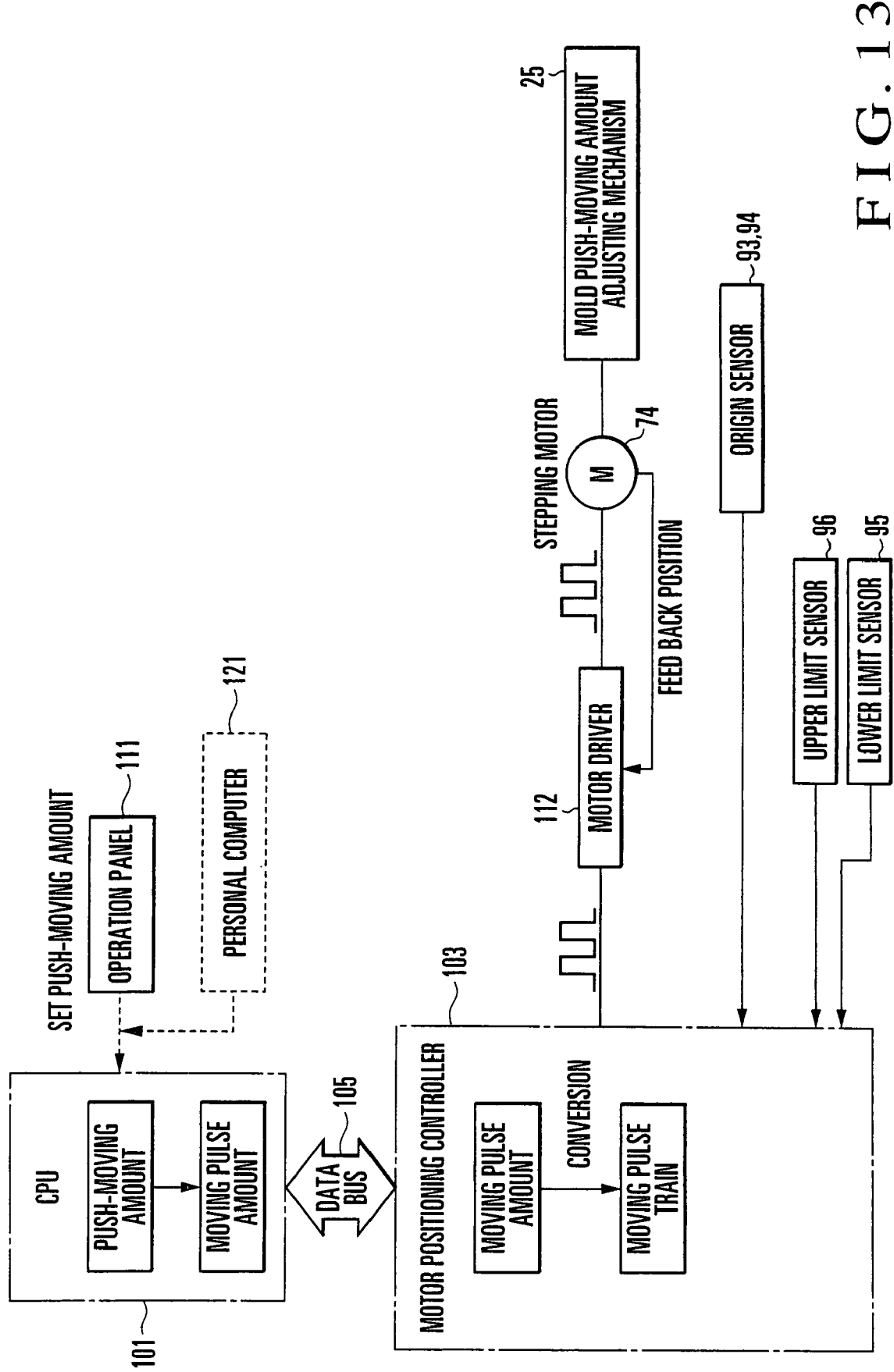
FIG. 13 is a block diagram showing a position control circuit.

Referring to FIG. 13, when push-moving amount data is input to the CPU 101 from the operation panel 111 or the input unit of the personal computer 121, the CPU 101 converts the data into a pulse amount and transmits it to the motor positioning controller 103 through the data bus 105. The motor positioning controller 103 is a unit which controls the motor driver 112 by a pulse train. The motor positioning controller 103 converts the pulse amount data set by the CPU 101 into a pulse train and outputs it to the stepping motor 74 through the motor driver 112. The stepping motor 74 rotates by a rotation count corresponding to the given pulse amount to move the adjusting screw 87 upward. The stepping motor 74 includes an encoder to detect the rotational position. A detection signal from the encoder is fed back to the motor driver 112 to control the position of the adjusting screw 87 highly accurately. The motor positioning controller 103 detects the sensor disk 98 (FIG. 5) by the second origin sensor 94 to position the adjusting screw 87 at the initial height. When the first origin sensor 93 detects the slit 97*a* of the sensor slit cam 97, the motor positioning controller 103 determines the detected position as the position of origin of the adjusting screw 87.

The assembling procedure of the plastic-lens-forming casting mold 1 by the assembling device 20 will be described.

The assembling method for the casting mold 1 shown in FIGS. 1 to 3 will be described.

First, a gasket 2 and molds 3 and 4 (FIG. 1) matching a lens to be formed are selected and prepared. The adjusting screw 87 held at the position of origin is moved upward by a predetermined amount to set in the assembling device 20 the push-moving amount H (FIG. 7) which is required to push the mold 4 into the gasket 2.

When setting the push-moving amount H, the operator inputs push-moving amount data which matches the mold 4 into the I/O controller 102 (FIGS. 12 and 13) via the operation panel 111 or the input unit of the personal computer 121 (FIG. 13). When the push-moving amount data is input to the I/O controller 102, the CPU 101 converts the data into a pulse count, as described above, and transmits it to the motor positioning controller 103. The motor positioning controller 103 sends a driving signal to the motor driver 112 to drive the stepping motor 74. Upon reception of a pulse signal from the motor driver 112, the stepping motor 74 rotates by a rotation count corresponding to the pulse count to move the adjusting screw 87 upward. More specifically, when the stepping motor 74 is driven, the rotation of its output shaft 79 (FIG. 7) is transmitted to the spline shaft 75 through the coupling 80. The rotation of the spline shaft 75 is transmitted to the adjusting screw 87 through the spline-coupled spline bearing 88. Accordingly, the adjusting screw 87 rotates together with the spline shaft 75. As the adjusting screw 87 threadably engages with the stationary nut 89, it moves upward to a predetermined height along the stationary nut 89 and stops to set the predetermined push-moving amount H with respect to the stopper 91.

Subsequently, a lower mold ring 35 (FIG. 6) which matches the size of the lens to be formed is selected, and fitted in the large-diameter hole portion 36*a* of the fitting hole 36 of the lower plate 32. The pair of molds 3 and 4 are pressed into the gasket 2 and temporarily assembled with the mold guides 7 and 8, respectively, such that the lens-forming optical surfaces 3*b* and 4*a* oppose each other (FIG. 2). In this state, the central portion of the upper surface of the upper mold 3 projects upward from the upper surface of the gasket 2. Part of the peripheral portion of the lower mold 4 projects downward from the lower surface of the gasket 2.

The plastic-lens-forming casting mold 1 in this temporarily assembled state is set on the lower mold ring 35 (FIGS. 6 and 11). The casting mold 1 is set by fitting that portion of the peripheral portion of the lower mold 4 which projects downward from the gasket 2 in the fitting groove 38 of the lower mold ring 35. In this state, the lower end of the gasket 2 is not yet in contact with the upper surface of the lower mold ring 35 (FIG. 11). The molds 3 and 4 may be temporarily assembled in the gasket 2 manually, or automatically using a robot or the like. The order of adjusting the push-moving amount H by the mold push-moving amount adjusting mechanism 25 and mounting the plastic-lens-forming casting mold 1 in the lower mold ring 35 may be reversed.

Figure 14:
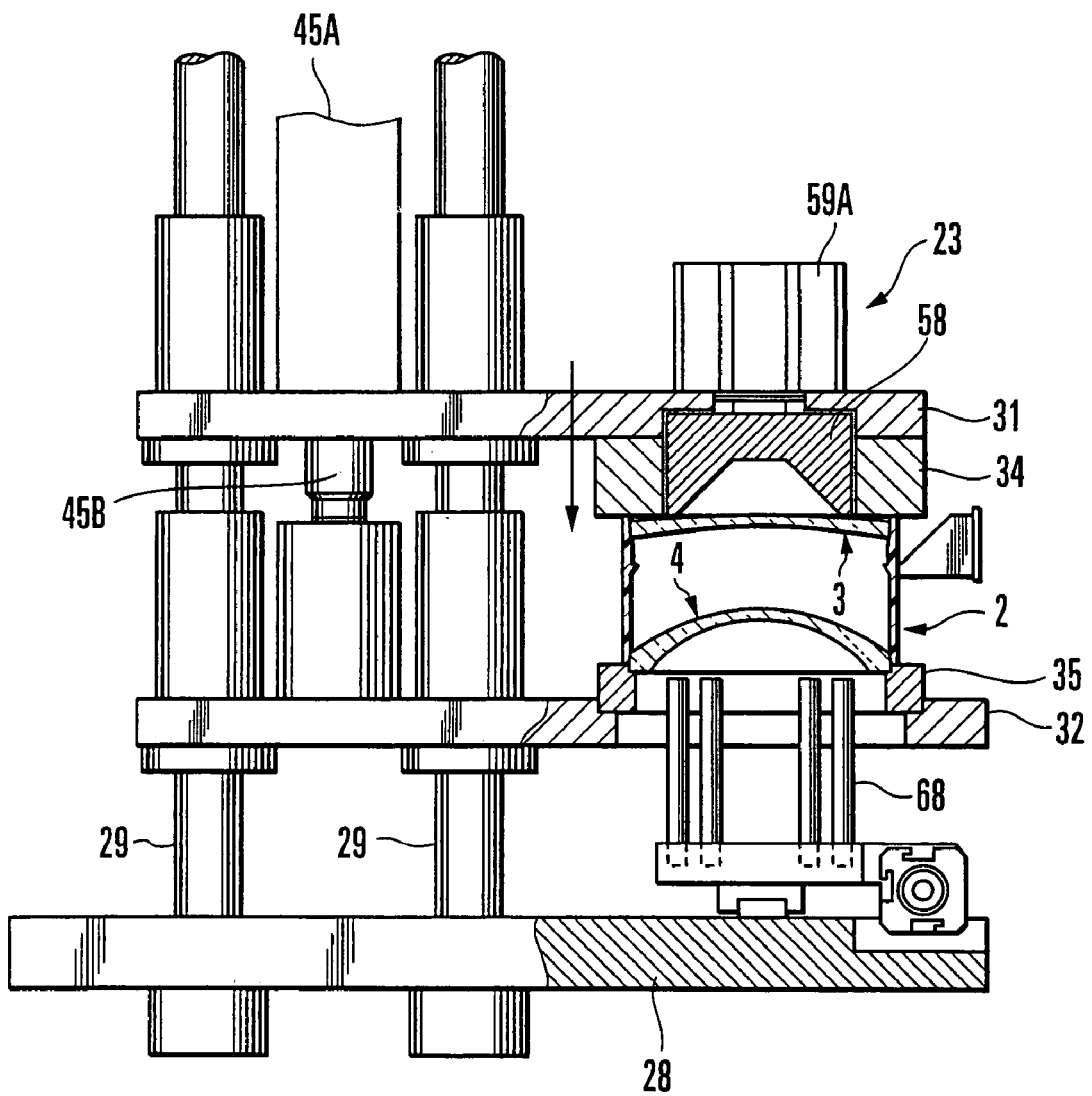
FIG. 14 is a view for explaining the assembling operation of the plastic-lens-forming casting mold.

When the plastic-lens-forming casting mold 1 is set on the lower mold ring 35, the gasket-pressing ring 34 and gasket-pressing ring 34 clamp the gasket 2 from the axial direction (FIG. 14). The step of clamping the gasket 2 by the gasket-pressing ring 34 and lower mold ring 35 is performed by operating the gasket-pressing pneumatic cylinder 45, moving the piston rod 45B backward to move the upper plate 31 downward, and urging the lower surface 34*a* of the gasket-pressing ring 34 against the upper surface of the upper mold 3. More specifically, when the gasket-pressing ring 34 is urged against the upper mold 3, the upper mold 3 is pushed into the gasket 2. When the upper mold 3 is completely pushed into the gasket 2, the lower surface 34*a* of the gasket-pressing ring 34 presses the upper end face of the gasket 2 to urge the lower end face of the gasket 2 against the upper surface of the lower mold ring 35. Thus, the gasket 2 is clamped by the gasket-pressing ring 34 and lower mold ring 35 from the axial direction. FIG. 14 shows this state.

When the upper mold 3 is pushed into the gasket 2 by the gasket-pressing ring 34, the upper mold 3 rides over the taper 9 to elastically deform the upper end of the gasket 2 outwardly, thus enlarging the diameter of the gasket 2.

Figure 15:
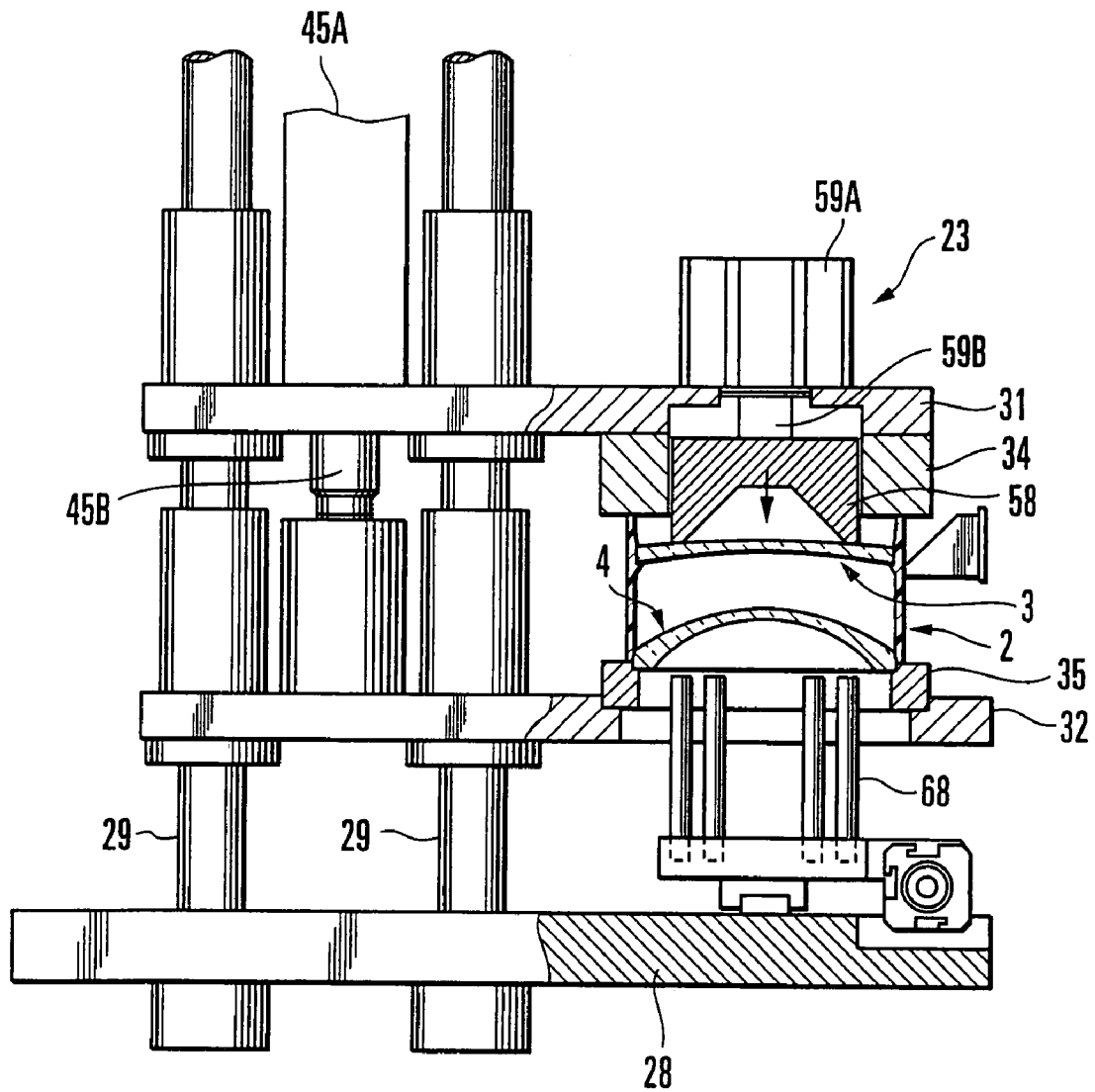
FIG. 15 is a view for explaining the assembling operation of the plastic-lens-forming casting mold.

Then, the upper-mold-pressing pneumatic cylinder 59 is driven to extend the piston rod 59B out from the cylinder main body 59A (FIG. 15). When the piston rod 59B moves downward, it projects the push-in member 58 below the gasket-pressing ring 34 to urge the push-in member 58 against the upper mold 3. Therefore, the upper mold 3 is further pushed into the gasket 2 by the push-in member 58 and urged against the ring-like projection 5 (FIG. 3) projecting from the inner surface of the gasket 2. At this time, since the output from the gasket-pressing pneumatic cylinder 45 is set to be larger than the output from the upper-mold-pressing pneumatic cylinder 59, when the push-in member 58 is urged against the upper mold 3, the gasket-pressing ring 34 which presses the gasket 2 will not move upward to be restored together with the upper plate 31 to release the gasket 2. The inner diameter $d_1$ of the gasket 2 is set smaller than the outer diameter $D_1$ of the upper mold 3. Thus, when the upper mold 3 is pushed into the gasket 2, the gasket 2 elastically deforms in the diameter-enlarging directions, and fastens and holds the upper mold 3 with its restoration force.

Figure 16:
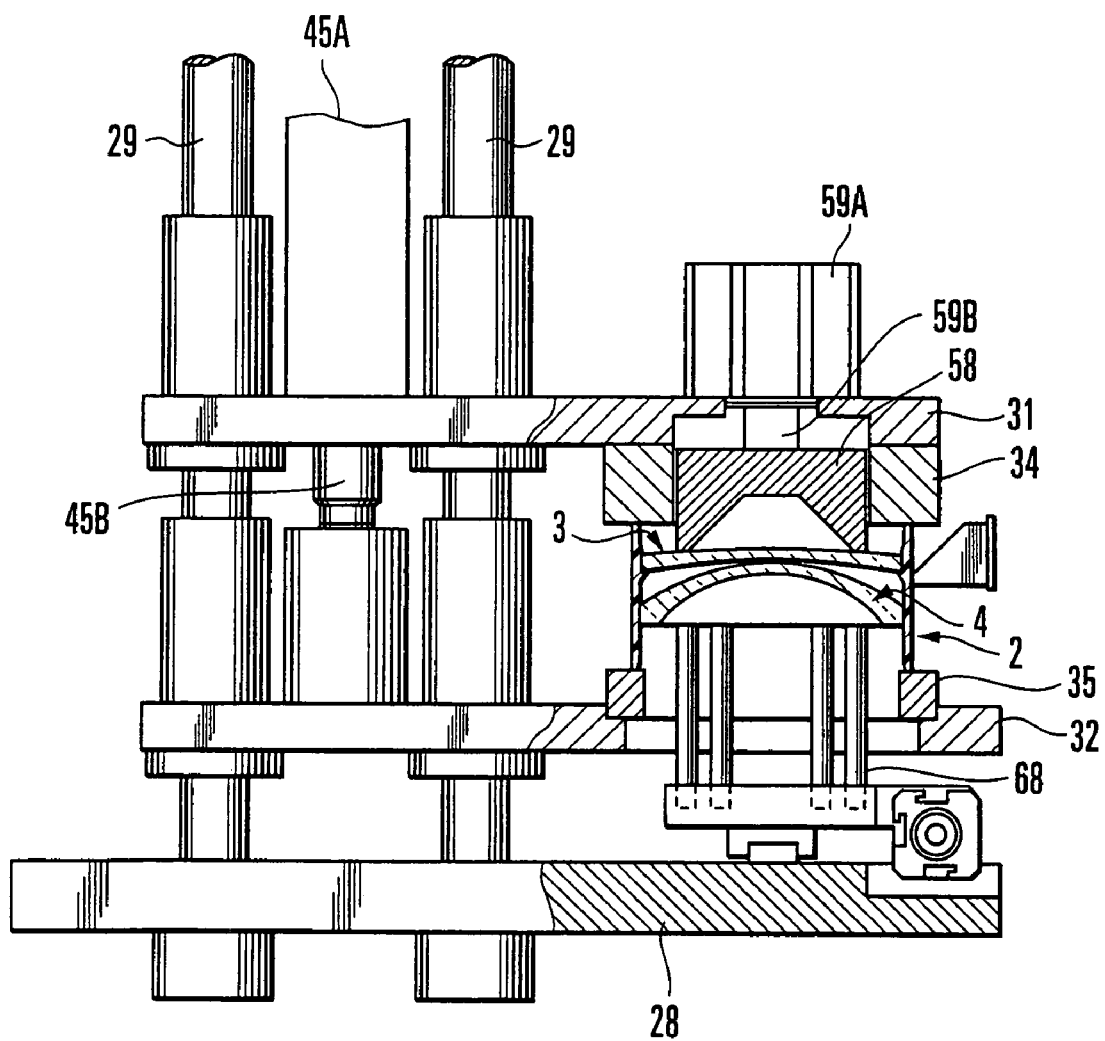
FIG. 16 is a view for explaining the assembling operation of the plastic-lens-forming casting mold.

When the first mold push-in step by the push-in member 58 is ended, the lower mold 4 is pushed into the gasket 2 in the second mold push-in step (FIG. 16). The second mold push-in step is performed by driving the main pneumatic cylinder 46 (FIG. 7). More specifically, when the main pneumatic cylinder 46 is driven, its piston rod 46B moves backward to move the lower plate 32 downward by a predetermined distance. At this time, since the upper plate 31 is coupled to the lower plate 32 through the gasket-pressing pneumatic cylinder 45, it moves together with the lower plate 32 while maintaining a predetermined gap from the lower plate 32. Therefore, the gasket 2 is clamped by the gasket-pressing ring 34 and lower mold ring 35, and maintains a state wherein the upper mold 3 is pressed by the push-in member 58.

When the downward movement of the upper plate 31 and lower plate 32 moves the gasket 2 downward, the lower surface 4c of the lower mold 4 which is fitted in the lower mold ring 35 comes into contact with the upper surfaces of the push pins 68. After coming into contact with the push pins 68, the lower mold 4 further moves downward by a predetermined distance. Accordingly, the lower mold 4 is pushed up by the push pins 68 to ride over the taper 10 of the gasket 2, so that it is pushed into the gasket 2 (FIG. 16). When the stopper 91 fixed to the lower plate 32 abuts against the upper surface of the adjusting screw 87, the lower plate 32 stops to end the push-in operation of the mold 4 by the push pins 68. When the lower plate 32 stops, the upper and lower molds 3 and 4 oppose each other at a predetermined gap, and the space surrounded by the molds 3 and 4 and gasket 2 forms a cavity 13. When the lower mold 4 is pushed into the gasket 2, the gasket 2 elastically deforms in the diameter-enlarging directions to fasten and hold the lower mold 4. Consequently, the gasket 2 deforms into a barrel shape having a large outer diameter at its center in the direction of height (FIG. 3).

To push the lower mold 4 into the gasket 2 by a predetermined amount, the distance H from the upper surface of the adjusting screw 87 to the lower surface of the stopper 91 may be determined for each lens. The gasket 2 moves downward vertically as it is clamped by the gasket-pressing ring 34 and lower mold ring 35. Thus, the lower mold 4 will not be inclined with respect to the gasket 2, but is pushed in accurately by the push pins 68.

After a state wherein the mold 4 is pushed into the gasket 2 by the push pins 68 and the stopper 91 is urged against the adjusting screw 87 continues for a predetermined period of time, the upper-mold-pressing pneumatic cylinder 59 moves the piston rod 59B backward to release the upper mold 3 which has been pressed by the push-in member 58. When the gasket-pressing pneumatic cylinder 45 and main pneumatic cylinder 46 are driven to extend both the piston rods 45B and 46B, the gasket clamping mechanism 22 is restored to the initial state. As a result, the gasket 2 is released from the gasket-pressing ring 34 and lower mold ring 35, and automatic assembly of the gasket 2 and pair of molds 3 and 4 is completed.

After the assembling operation of the molds 3 and 4 by the assembling device 20 is completed, the retreating operation of retreating the push-in member 58 from the mold 3 is preferably performed after it is confirmed that the gasket 2 temporarily, elastically deforms into a barrel shape to clamp the molds 3 and 4 stably. This is because the time lag of the flexibility of the gasket 2 must be considered.

With this assembling device 20, since the plastic-lens-forming casting mold 1 can be assembled automatically, the assembling workability can be improved. Also, variations in assembly are small, so that the molds 3 and 4 can be assembled in the gasket 2 highly accurately. The push-moving amount H required when assembling the lower mold 4 can be variably set by the mold push-moving amount adjusting mechanism 25 in accordance with the lens to be formed. Thus, various types of plastic-lens-forming casting molds can be assembled.

With the assembling device 20, the slide plates 66 and 67 (FIGS. 8 to 10) are biased in the opening directions and the push pins 68 which push the lower mold 4 into the gasket 2 are brought into contact with the hole wall of the lower mold ring 35. Thus, the push pins 68 can be commonly used for various types of lower mold rings 35 having different inner diameters, so that the device can be handled simply and easily.

With the assembling device 20, the gasket 2 is clamped by the gasket-pressing ring 34 and lower mold ring 35 from only the axial direction. Thus, when pushing in the molds 3 and 4, the gasket 2 can be elastically deformed in the diameter-enlarging directions, so that it can be pushed in reliably.

Figure 17:
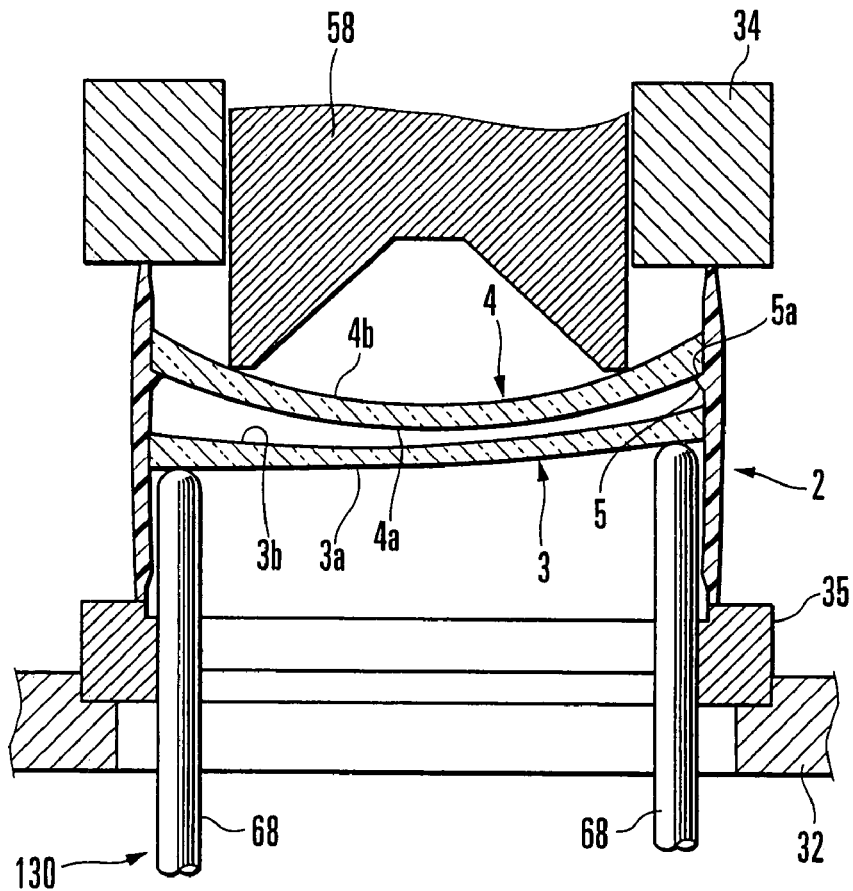
FIG. 17 is a sectional view of the main part to show another embodiment of the present invention.
Figure 18:
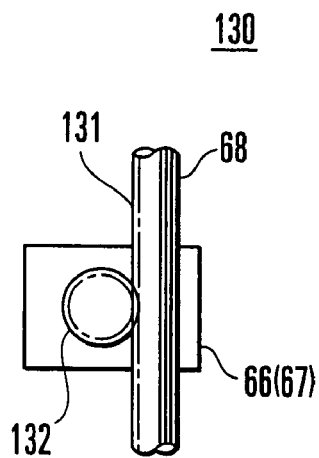
FIG. 18 is a view showing a push pin height adjusting mechanism.

FIG. 17 is a sectional view of the main part showing another embodiment of the present invention, and FIG. 18 is a view showing a push pin height adjusting mechanism.

With the assembling device according to this embodiment, a mold 4 with its lens-forming optical surface 4a facing down is pushed into a gasket 2 from the upper open end of the gasket 2 by a push-in member 58, and urged against a support surface 5a of a projection 5. A mold 3 with its lens-forming optical surface 3b facing up is pushed into the gasket 2 from the lower open end of the gasket 2 by a plurality of push pins 68. The assembling device includes height adjusting mechanisms 130 for the push pins 68 which adjust the heights of the respective push pins 68 individually and independently of each other.

Each height adjusting mechanism 130 includes a rack 131 which is formed around the corresponding push pin 68, a pinion 132 which is formed on a slide plate 66 (67) and meshes with the rack 131, and a motor (not shown) which rotates the pinion 132. The motor is not limited to this, but may be a pneumatic cylinder or the like. The push pins 68 need not have the same length, but can be exchanged for push pins 68 having different lengths.

With the assembling device having the above structure, since the heights of the respective push pins 68 can be adjusted by the height adjusting mechanisms 130 individually and independently of each other, the lower mold 3 can be incorporated to be inclined with respect to the upper mold 4. Thus, a prism lens used for eye position correction can be fabricated.

The above embodiment shows the vertical assembling device 20 in which the gasket 2 is set vertically and clamped from above and below by the gasket-pressing ring 34 and lower mold ring 35. However, the present invention is not limited to this at all, but can also be applied to a horizontal assembling device in which the gasket 2 is set horizontally and clamped from the horizontal direction. In this case, as the lower mold ring 35 is set horizontally, the peripheral portion of the mold 4 is fitted in the fitting groove 38 of the horizontal lower mold ring 35 from the horizontal direction. Accordingly, the casting mold can readily fall from the lower mold ring 35. In this case, the gasket 2 is preferably supported by an appropriate support means until it is completely clamped by a gasket-pressing ring 34 and lower mold ring 35.

In the above embodiment, while the gasket 2 is clamped by the gasket-pressing ring 34 and lower mold ring 35, the lower plate 32 is moved downward to urge the lower mold 4 against the push pins 68. As the lower mold 4 and push pins 68 operate relative to each other, the lower mold 4 may be pushed into the gasket 2 by the upward movement of the push pins 68.

In the above embodiment, pneumatic cylinders are used as the driving sources for the clamping driving unit 45, gasket-moving driving unit 46, and mold-pressing driving unit 59. However, the driving sources are not limited to the pneumatic cylinders, but motors may be used.

With the assembling device for the plastic-lens-forming casting mold according to the above embodiment, the gasket only need be clamped from the axial direction. This enables the gasket to elastically deform in the diameter-enlarging directions when the molds are pushed into the gasket, so that the molds can be pushed in reliably and highly accurately.

According to the above embodiment, the plastic-lens-forming casting mold can be assembled automatically, and accordingly the assembling workability can be improved.

With the assembling device of the embodiment described above, the push-moving amount required when pushing in the molds can be freely set. Thus, various types of plastic-lens-forming casting molds can be assembled.

With the assembling device of the embodiment described above, the molds are pushed in by using openable/closeable push pins. The assembling device can be commonly used for a plurality of types of casting molds having different diameters only by preparing the second clamping means having a different inner diameter. Thus, the device can be handled simply and easily.

With the assembling device of the embodiment described above, the heights of the push pins can be adjusted individually and independently of each other. Thus, a prism lens can also be fabricated, and the versatility of the device can be increased.

With an assembling method for a plastic-lens-forming casting mold of the embodiment described above, the gasket is clamped from the axial direction and the pair of molds are pushed in sequentially. The gasket can be elastically deformed in the diameter-enlarging directions by pushing in the molds. Thus, the molds can be incorporated in the gasket reliably and highly accurately.

With the assembling method of the embodiment described above, a plurality of openable/closeable push pins are used as the second push-in means. Thus, the assembling method can be commonly applied to a plurality of types of casting molds having different diameters. Also, since the heights of the push pins can be adjusted individually and independently of each other, a prism lens can be fabricated.

With the assembling method of the embodiment described above, a flat surface formed on the peripheral portion of that surface of the other mold which is opposite to the lens-forming optical surface is pressed by the second push-in means. Thus, the other mold can be incorporated accurately without being inclined, thus improving the accuracy of lens thickness control.

The assembling method of the embodiment described above comprises the step of setting the push-moving amount of the other mold. Thus, the accuracy of lens thickness control is further improved, and a plurality of types of plastic-lens-forming casting molds can be assembled.

As has been described above, the assembling device and method according to the present invention are effectively used in the assembly of a plastic-lens-forming casting mold.

The invention claimed is:

1. An assembling method for a plastic-lens-forming casting mold comprising
fitting and temporarily fixing a pair of molds in two open ends of a casting gasket integrally having a positioning projection projecting from an inner surface of the casting gasket such that lens-forming optical surfaces of the pair of molds oppose each other,
clamping the casting gasket by a pair of clamping means from an axial direction,
pushing one of the pair of molds into the gasket by a first push-in means to urge the mold against the projection, and
pushing the other mold into the gasket by a second push-in means for a predetermined amount,
wherein the pushing the other mold includes pressing a peripheral portion of a surface of the other mold which is opposite to a lens-forming optical surface by using, as the second push-in means, a plurality of pins which are biased in enlarging directions.

2. An assembling method for a plastic-lens-forming casting mold according to claim 1, wherein the pressing the peripheral portion of the surface of the other mold includes providing the plurality of pins such that heights thereof are adjustable individually and independently of each other.

3. An assembling method for a plastic-lens-forming casting mold comprising
fitting and temporarily fixing a pair of molds in two open ends of a casting gasket integrally having a positioning projection projecting from an inner surface of the casting gasket such that lens-forming optical surfaces of the pair of molds oppose each other,
clamping the casting gasket by a pair of clamping means from an axial direction,
pushing one of the pair of molds into the gasket by a first push-in means to urge the mold against the projection, and
pushing the other mold into the gasket by a second push-in means for a predetermined amount,
wherein the pushing the other mold includes pressing a flat surface which is formed on an outer peripheral portion of a concave surface of the other mold.

4. An assembling method for a plastic-lens-forming casting mold comprising
fitting and temporarily fixing a pair of molds in two open ends of a casting gasket integrally having a positioning projection projecting from an inner surface of the casting gasket such that lens-forming optical surfaces of the pair of molds come inside,
clamping the casting gasket by a pair of clamping means from an axial direction,
pushing one of the pair of molds into the gasket by a first push-in means to urge the mold against the projection,
pushing the other mold into the gasket by a second push-in means for a predetermined amount, and
further comprising setting a push-moving amount of the second push-in means for the other mold to match a type of a lens.

* * * * *